US010959175B2

(12) United States Patent
Liu et al.

(10) Patent No.: US 10,959,175 B2
(45) Date of Patent: Mar. 23, 2021

(54) WAKE UP SIGNAL CONFIGURATIONS FOR WIRELESS COMMUNICATIONS

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/224,679

(22) Filed: Dec. 18, 2018

(65) Prior Publication Data

US 2019/0200296 A1   Jun. 27, 2019

Related U.S. Application Data

(60) Provisional application No. 62/609,178, filed on Dec. 21, 2017.

(51) Int. Cl.
*H04W 52/02* (2009.01)
*H04W 4/70* (2018.01)
(Continued)

(52) U.S. Cl.
CPC ......... *H04W 52/0229* (2013.01); *H04W 4/00* (2013.01); *H04W 24/10* (2013.01);
(Continued)

(58) Field of Classification Search
CPC ... H04W 24/10; H04W 4/00; H04W 52/0229; H04W 52/241; H04W 52/26;
(Continued)

(56) References Cited

U.S. PATENT DOCUMENTS

2010/0254343 A1\* 10/2010 Choi ................... H04L 27/0014
370/330
2016/0029407 A1\* 1/2016 Soldati .................. H04W 76/28
370/329
(Continued)

FOREIGN PATENT DOCUMENTS

EP   2840841 A1   2/2015

OTHER PUBLICATIONS

International Search Report and Written Opinion—PCT/US2018/066451—ISA/EPO—dated Mar. 27, 2019.
(Continued)

*Primary Examiner* — Gbemileke J Onamuti
(74) *Attorney, Agent, or Firm* — Holland & Hart LLP

(57) ABSTRACT

Methods, systems, and devices for wireless communications are described. A wireless device, such as a user equipment (UE), may receive a wakeup signal (WUS) from a network node, such as a base station, before listening for a paging message. The UE may assume a maximum duration ($W_{max}$) for the WUS based on a dependency on variables associated with the base station and WUS. In some cases, the UE may determine not to monitor a WUS for the $W_{max}$ and may engage in an early termination based on the determination. That is, the UE may monitor the WUS for a time shorter than $W_{max}$. The UE may assume the shorter time has a dependency on variables associated with the base station and WUS. The base station may indicate this dependency to the UE either implicitly or explicitly.

79 Claims, 13 Drawing Sheets

(51) Int. Cl.
| | |
|---|---|
| *H04W 68/02* | (2009.01) |
| *H04W 52/26* | (2009.01) |
| *H04W 24/10* | (2009.01) |
| *H04W 52/24* | (2009.01) |
| *H04W 52/14* | (2009.01) |
| *H04W 4/00* | (2018.01) |
| *H04W 52/32* | (2009.01) |

(52) U.S. Cl.
CPC ..... *H04W 52/0235* (2013.01); *H04W 52/146* (2013.01); *H04W 52/241* (2013.01); *H04W 52/246* (2013.01); *H04W 52/248* (2013.01); *H04W 52/26* (2013.01); *H04W 52/325* (2013.01); *H04W 68/02* (2013.01); *H04W 4/70* (2018.02)

(58) Field of Classification Search
CPC ............... H04W 68/02; H04W 52/248; H04W 52/0235; H04W 52/246
See application file for complete search history.

(56) References Cited

U.S. PATENT DOCUMENTS

2017/0026907 A1    1/2017  Min et al.
2018/0255515 A1*   9/2018  Gupta Hyde ......... H04W 88/08

OTHER PUBLICATIONS

LG Electronics: "Discussion on Wake Up Signal Configurations and Procedures", 3GPP Draft, 3rd Generation Partnership Project (3gpp), Mobile Competence Centre, 650, Route Des Lucioles, Sophia-Antipolis Cedex, France, R1-1719878, F-06921, vol. RAN WG1, no. Reno, USA; Nov. 27, 2017-Dec. 1, 2017, Nov. 18, 2017 (Nov. 18, 2017), XP051369591, 5 pages, Retrieved from the Internet: URL: https://www.3gpp.org/ftp/tsg_ran/WG1_RL1/TSGR1_91/ Docs/ [retrieved on Nov. 18, 2017].

* cited by examiner

WAKE UP SIGNAL CONFIGURATIONS FOR WIRELESS COMMUNICATIONS

CROSS REFERENCES

The present application for patent claims the benefit of U.S. Provisional Patent Application No. 62/609,178 by LIU, et al., entitled "WAKE UP SIGNAL CONFIGURATIONS FOR WIRELESS COMMUNICATIONS," filed Dec. 21, 2017, assigned to the assignee hereof, and expressly incorporated herein.

BACKGROUND

The following relates generally to wireless communications, and more specifically to wakeup signal configurations for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., Internet of Things (IoT) or enhanced machine type communication (eMTC)), a base station may transmit data to a UE on an intermittent basis. Accordingly, the base station may signal to the UE that data and/or control information is available for the UE by transmitting a paging message in a downlink channel prior to a data and/or system information transmission. In some cases, the base station and UE may utilize a power saving signal, such as a wakeup signal (WUS), for idle mode paging. For example, the UE may wake from a sleep state upon receiving the WUS and monitor for downlink transmissions (such as the paging message) from the base station. The WUS may have a maximum duration to indicate how long the UE may monitor the downlink channel before going back into the sleep state (e.g., if the paging message is not received). However, waiting the maximum duration may shorten the battery life of the UE. Improved techniques are desired for indicating a duration of the WUS that may help extend battery life and reduce power consumption at wireless devices.

SUMMARY

The described techniques relate to improved methods, systems, devices, or apparatuses that support wakeup signal (WUS) configurations for wireless communications. Generally, the described techniques provide for a base station providing a scaling factor for a WUS to a user equipment (UE). The scaling factor may include or indicate a transmit power used by the base station to transmit the WUS and/or a transmit diversity scheme used for transmission of the WUS. As such, the scaling factor may indicate to the UE one or more of the following characteristics of the WUS a number of configured time units (e.g., subframes, slots, mini-slots) for transmission of the WUS, a transmission diversity dimension corresponding to the number of antenna ports used for transmission of the WUS, or whether the WUS may be detected prior to a detection of legacy synchronization signals. In some examples, the scaling factor may indicate or include a power ratio between the WUS and a narrowband reference signal, a maximum coupling loss (MCL), or a combination thereof. The scaling factor may be indicated by the base station via system information such as via a system information block (SIB) (e.g., transmitted via a broadcast channel).

Using the scaling factor, the UE may determine a duration for reception of the WUS. The duration may correspond to the time period the UE is to monitor for reception of the WUS prior to an early termination and may be based on a signal quality of a reference signal and a probability of detection threshold, which may be based on an associated control channel repetition parameter.

A method of wireless communications is described. The method may include receiving, from a base station, an indication of a scaling factor associated with a WUS, where the scaling factor is based on a WUS transmission characteristic, receiving, from the base station and for a WUS time duration, the WUS in accordance with the WUS transmission characteristic, where the WUS time duration is determined based on the scaling factor and an associated control channel repetition parameter, and monitoring a downlink channel from the base station for scheduling information based on the received WUS, where the scheduling information includes information for a paging message from the base station.

An apparatus for wireless communications is described. The apparatus may include means for receiving, from a base station, an indication of a scaling factor associated with a WUS, where the scaling factor is based on a WUS transmission characteristic, means for receiving, from the base station and for a WUS time duration, the WUS in accordance with the WUS transmission characteristic, where the WUS time duration is determined based on the scaling factor and an associated control channel repetition parameter, and means for monitoring a downlink channel from the base station for scheduling information based on the received WUS, where the scheduling information includes information for a paging message from the base station.

Another apparatus for wireless communications is described. The apparatus may include a processor, memory in electronic communication with the processor, and instructions stored in the memory. The instructions may be operable to cause the processor to receive, from a base station, an indication of a scaling factor associated with a WUS, where the scaling factor is based on a WUS transmission characteristic, to receive, from the base station and for a WUS time duration, the WUS in accordance with the WUS transmission characteristic, where the WUS time duration is determined based on the scaling factor and an associated control channel repetition parameter, and to monitor a downlink channel from the base station for scheduling information based on the received WUS, where the scheduling information includes information for a paging message from the base station.

A non-transitory computer-readable medium for wireless communications is described. The non-transitory computer-readable medium may include instructions operable to cause a processor to receive, from a base station, an indication of a scaling factor associated with a WUS, where the scaling factor is based on a WUS transmission characteristic, to receive, from the base station and for a WUS time duration, the WUS in accordance with the WUS transmission characteristic, where the WUS time duration is determined based on the scaling factor and an associated control channel repetition parameter, and to monitor a downlink channel from the base station for scheduling information based on the received WUS, where the scheduling information includes information for a paging message from the base station.

Some examples of the method, apparatus, and non-transitory computer-readable medium described above may further include processes, features, means, or instructions for receiving, from the base station, an indication of the WUS time duration.

Some examples of the method, apparatus, and non-transitory computer-readable medium described above may further include processes, features, means, or instructions for determining a WUS reception duration based on a signal quality of a reference signal and a probability of detection threshold, where WUS reception duration is less than the WUS time duration.

In some examples of the method, apparatus, and non-transitory computer-readable medium described above, the WUS reception duration may be determined based on the WUS transmission characteristic.

Some examples of the method, apparatus, and non-transitory computer-readable medium described above may further include processes, features, means, or instructions for receiving the reference signal from the base station. Some examples of the method, apparatus, and non-transitory computer-readable medium described above may further include processes, features, means, or instructions for measuring the signal quality of the reference signal.

In some examples of the method, apparatus, and non-transitory computer-readable medium described above, the indication of the scaling factor includes a WUS transmit scheme.

Some examples of the method, apparatus, and non-transitory computer-readable medium described above may further include processes, features, means, or instructions for determining the scaling factor associated with the WUS based on the WUS transmit scheme.

In some examples of the method, apparatus, and non-transitory computer-readable medium described above, receiving the indication of the scaling factor includes receiving a SIB that includes the indication of the scaling factor, a value of the scaling factor, or a combination thereof.

Some examples of the method, apparatus, and non-transitory computer-readable medium described above may further include processes, features, means, or instructions for receiving a power offset parameter for the WUS in the SIB. Some examples of the method, apparatus, and non-transitory computer-readable medium described above may further include processes, features, means, or instructions for determining that no higher layer signaling has been received to configure a power ratio, where the power offset parameter includes a fixed power ratio between the narrowband reference signal and the WUS. Additionally or alternatively, some examples of the method, apparatus, and non-transitory computer-readable medium described above may further include processes, features, means, or instructions for determining that no higher layer signaling has been received to configure a power ratio, where the power offset parameter includes a fixed power ratio between a cell-specific reference signal and the WUS, and where the WUS is associated with machine type communication (MTC).

Some examples of the method, apparatus, and non-transitory computer-readable medium described above may further include processes, features, means, or instructions for determining a maximum WUS time duration based on a ratio of the associated control channel repetition parameter (e.g., a maximum repetition of an associated control channel) and the scaling factor, where the WUS time duration is based on the maximum WUS time duration. In some examples of the method, apparatus, and non-transitory computer-readable medium described above, the associated control channel repetition parameter may correspond to a maximum number of repetitions of an associated narrowband control channel for paging.

Some examples of the method, apparatus, and non-transitory computer-readable medium described above may further include processes, features, means, or instructions for receiving, from the base station, an indication of a transmit diversity dimension for transmission of the WUS.

In some examples of the method, apparatus, and non-transitory computer-readable medium described above, the transmit diversity dimension may be determined by a number of antennas switching on one antenna port every configured unit (e.g., two subframes) or by a number of antenna ports switching on all antenna ports every configured unit (e.g., two subframes), and where the configured unit includes a number of fixed basic units for WUS transmission.

In some examples of the method, apparatus, and non-transitory computer-readable medium described above, the WUS time duration may be determined based on a predetermined maximum WUS time duration, a maximum number of repetitions of an associated narrowband control channel, a required number of repetitions of the associated narrowband control channel for the UE, or a combination thereof. In some examples of the method, apparatus, and non-transitory computer-readable medium described above, the predetermined maximum WUS time duration may be indicated by a table.

In some examples of the method, apparatus, and non-transitory computer-readable medium described above, the WUS transmission characteristic includes a WUS transmit power, a WUS transmit diversity scheme, an indication of a legacy synchronization signal detection before WUS reception, a power ratio between the WUS and a narrowband reference signal, an MCL associated with the UE, or a combination thereof.

In some examples of the method, apparatus, and non-transitory computer-readable medium described above, the power ratio includes an energy per resource element (EPRE) power ratio. In some examples of the method, apparatus, and non-transitory computer-readable medium described above, a signal to noise ratio (SNR) may be determined based on a power ratio (e.g., the EPRE power ratio) between the WUS and a narrowband reference signal, and where a single port SNR may be estimated for the WUS based on the SNR.

In some examples of the method, apparatus, and non-transitory computer-readable medium described above, the transmit diversity scheme includes a pattern index of fixed patterns, with each pattern defining a number of fixed basic units and a transmit diversity dimension or includes the number of fixed basic units and the transmit diversity dimension. In some examples of the method, apparatus, and non-transitory computer-readable medium described above, the scaling factor may be based on a transmit diversity scheme that includes a pattern index of fixed patterns, with each pattern defining a number of fixed basic units and a transmit diversity dimension or includes the number of fixed basic units and the transmit diversity dimension.

In some examples of the method, apparatus, and non-transitory computer-readable medium described above, the fixed basic unit includes a number of subframes, a 1 millisecond (ms) transmission time interval (TTI), a slot, or a mini-slot.

Some examples of the method, apparatus, and non-transitory computer-readable medium described above may further include processes, features, means, or instructions for receiving a maximum number of repetitions of narrowband control channel transmissions in a SIB, where the WUS time duration may be determined based on the maximum number of repetitions of the narrowband control channel transmissions.

In some examples of the method, apparatus, and non-transitory computer-readable medium described above, the WUS time duration corresponds to a maximum WUS time duration. In some examples of the method, apparatus, and non-transitory computer-readable medium described above, the associated control channel repetition parameter may correspond to a maximum number of repetitions of transmissions on a narrowband control channel for paging.

Some examples of the method, apparatus, and non-transitory computer-readable medium described above may further include processes, features, means, or instructions for determining an early termination duration based on a target SNR or an MCL associated with the UE, where the WUS time duration is based on the early termination duration.

A method of wireless communications is described. The method may include transmitting an indication of a scaling factor associated with a WUS to a UE, where the scaling factor is determined based on a WUS transmission characteristic, and transmitting, to the UE and for a WUS time duration, the WUS in accordance with the WUS transmission characteristic, where the WUS time duration is determined based on the scaling factor and an associated control channel repetition parameter.

An apparatus for wireless communications is described. The apparatus may include means for transmitting an indication of a scaling factor associated with a WUS to a UE, where the scaling factor is determined based on a WUS transmission characteristic, and means for transmitting, to the UE and for a WUS time duration, the WUS in accordance with the WUS transmission characteristic, where the WUS time duration is determined based on the scaling factor and an associated control channel repetition parameter.

Another apparatus for wireless communications is described. The apparatus may include a processor, memory in electronic communication with the processor, and instructions stored in the memory. The instructions may be operable to cause the processor to transmit an indication of a scaling factor associated with a WUS to a UE, where the scaling factor is determined based on a WUS transmission characteristic, and transmit, to the UE and for a WUS time duration, the WUS in accordance with the WUS transmission characteristic, where the WUS time duration is determined based on the scaling factor and an associated control channel repetition parameter.

A non-transitory computer-readable medium for wireless communications is described. The non-transitory computer-readable medium may include instructions operable to cause a processor to transmit an indication of a scaling factor associated with a WUS to a UE, where the scaling factor is determined based on a WUS transmission characteristic, and transmit, to the UE and for a WUS time duration, the WUS in accordance with the WUS transmission characteristic, where the WUS time duration is determined based on the scaling factor and an associated control channel repetition parameter.

Some examples of the method, apparatus, and non-transitory computer-readable medium described above may further include processes, features, means, or instructions for transmitting, to the UE, an indication of the WUS time duration, where the WUS time duration may be based on a target SNR or an MCL associated with the UE.

Some examples of the method, apparatus, and non-transitory computer-readable medium described above may further include processes, features, means, or instructions for transmitting, to the UE, a reference signal, where the WUS time duration may be based on a signal quality of the reference signal and a probability of detection threshold.

In some examples of the method, apparatus, and non-transitory computer-readable medium described above, the reference signal includes a narrowband reference signal or a cell-specific reference signal.

In some examples of the method, apparatus, and non-transitory computer-readable medium described above, the indication of the scaling factor includes a WUS transmit scheme.

In some examples of the method, apparatus, and non-transitory computer-readable medium described above, transmitting the indication of the scaling factor includes transmitting a SIB that includes the indication of the scaling factor, a value of the scaling factor, or a combination thereof. In some examples of the method, apparatus, and non-transitory computer-readable medium described above, transmitting the SIB may further include transmitting a power offset parameter that indicates a power ratio between a narrowband reference signal and the WUS.

Some examples of the method, apparatus, and non-transitory computer-readable medium described above may further include processes, features, means, or instructions for transmitting, to the UE, an indication of a transmit diversity dimension for transmission of the WUS.

Some examples of the method, apparatus, and non-transitory computer-readable medium described above may further include processes, features, means, or instructions for determining the transmit diversity dimension based on a number of antennas switching on one antenna port every configured unit (e.g., two subframes) or a number of antenna ports switching on all antenna ports every configured unit (e.g., two subframes), where the configured unit includes a number of fixed basic units for WUS transmission.

In some examples of the method, apparatus, and non-transitory computer-readable medium described above, the WUS time duration may be determined based on a predetermined maximum WUS time duration, a maximum number of repetitions of an associated narrowband control channel, a required number of repetitions of the associated narrowband control channel for the UE, or a combination thereof. In some examples of the method, apparatus, and non-transitory computer-readable medium described above, the predetermined maximum WUS time duration may be indicated by a table.

In some examples of the method, apparatus, and non-transitory computer-readable medium described above, the WUS transmission characteristic includes a WUS transmit power, a WUS transmit diversity scheme, an indication of a legacy synchronization signal detection of the UE before WUS detection, a power ratio between the WUS and a narrowband reference signal, an MCL associated with the UE, or a combination thereof.

In some examples of the method, apparatus, and non-transitory computer-readable medium described above, the power ratio includes an EPRE power ratio. In some examples of the method, apparatus, and non-transitory computer-readable medium described above, an SNR may be determined based on a power ratio (e.g., the EPRE power ratio) between the WUS and a narrowband reference signal, and where a single port SNR is estimated for the WUS may be based on the SNR.

In some examples of the method, apparatus, and non-transitory computer-readable medium described above, the transmit diversity scheme includes a pattern index of fixed patterns, with each pattern defining a number of fixed basic units and a transmit diversity dimension, or includes the number of fixed basic units and the transmit diversity dimension. In some examples of the method, apparatus, and non-transitory computer-readable medium described above, the scaling factor may be based on a transmit diversity scheme that includes a pattern index of fixed patterns, with each pattern defining a number of fixed basic units and a transmit diversity dimension or includes the number of fixed basic units and the transmit diversity dimension.

In some examples of the method, apparatus, and non-transitory computer-readable medium described above, the fixed basic unit includes a number of subframes, a 1 ms TTI, a slot, or a mini-slot.

Some examples of the method, apparatus, and non-transitory computer-readable medium described above may further include processes, features, means, or instructions for transmitting a maximum number of repetitions of narrowband control channel transmissions in a SIB, where the duration may be based on the maximum number of repetitions of the narrowband control channel transmissions.

In some examples of the method, apparatus, and non-transitory computer-readable medium described above, the WUS time duration may correspond to a maximum WUS time duration. In some examples of the method, apparatus, and non-transitory computer-readable medium described above, the associated control channel repetition parameter may correspond to a maximum number of repetitions of transmissions on a narrowband control channel for paging.

Some examples of the method, apparatus, and non-transitory computer-readable medium described above may further include processes, features, means, or instructions for identifying an SNR for the UE, where the scaling factor may be determined based on the SNR.

DETAILED DESCRIPTION

Figure 1:
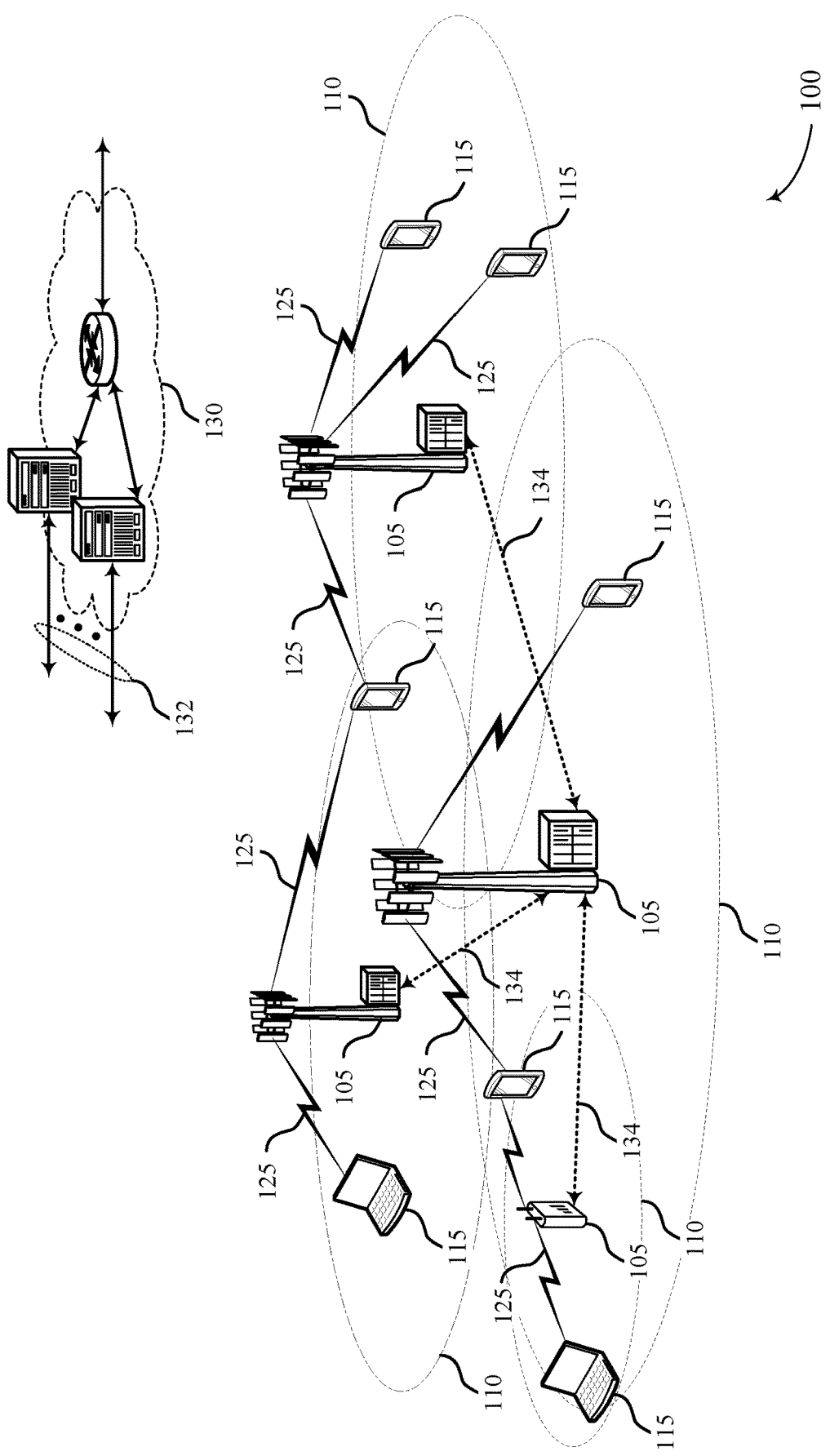
FIG. 1 illustrates an example of a wireless communications system that supports wakeup signal (WUS) configurations for wireless communications in accordance with aspects of the present disclosure.

In some wireless communications systems (e.g., Internet of Things (IoT) or enhanced machine type communication (eMTC)), a base station may page a user equipment (UE) via a downlink channel (e.g., physical downlink control channel (PDCCH) or narrowband PDCCH (NPDDCH)) to indicate data and/or control information is available for the UE. In order to detect a potential paging message, the UE may consistently monitor the downlink channel. However, it may be desirable to only monitor during certain time-frequency resources of the downlink channel for the paging message in order to reduce power consumption at the UE. Accordingly, the base station may transmit a wakeup signal (WUS) to the UE in order to wake the UE from a sleep state and indicate to the UE to monitor the downlink channel for the paging message during a corresponding paging occasion. If the UE does not receive the WUS, there may not be a paging message for the UE in the downlink channel, and the UE may remain in the sleep state (e.g., until the base station retransmits the WUS).

The base station may configure a maximum duration for the WUS and provide an indication of the maximum duration to the UE. This indication may be transmitted via a system information block (SIB) on a carrier (e.g., a narrowband (NB)-IoT carrier) prior to transmitting the WUS. In some cases, the base station may configure the WUS maximum duration specific to the carrier. The UE may assume a maximum duration ($W_{max}$) for the WUS based on variables associated with the base station and the WUS. For example, $W_{max}$ may depend on a transmission power of the WUS, a transmission diversity used by the base station for the WUS, whether the WUS may be detected prior to the detection of legacy synchronization signals, or any combination thereof. This dependency may be represented by a scaling factor, $K_W$. In some cases, the UE may determine the duration of the WUS based on a number of repetitions for the downlink channel. The number of repetitions may indicate the number of repetitions for the downlink channel in a paging occasion after a WUS ends or, alternatively, the possible locations for the downlink channel repetitions in the paging occasion.

In some cases, the UE may determine not to monitor a WUS for the maximum WUS duration and may engage in an early termination based on the determination. That is, the UE may monitor the WUS for a time W where W may be less than $W_{max}$. The UE may decide a value for W such that it meets a certain probability of detection of the WUS. The UE may further assume a relationship between the calculated $W_{max}$ and W, where the UE will listen to the WUS. In some cases, the UE may not have determined the value of $W_{max}$, and instead the UE may assume W is a function of the repetitions and a scaling factor, such as $K_W$.

In some cases, the base station may indicate the value of $K_W$ to the UE explicitly. Additionally or alternatively, the base station may indicate the value of $K_W$ implicitly. For example, the value of $K_W$ may be known based on a transmission diversity known by the UE. In another example, the UE may determine the value of $K_W$ based on a transmission scheme known by the UE. In another example, the UE may determine the value of $K_W$ based on a transmission diversity dimension and signal power information known by the UE.

Aspects of the disclosure are initially described in the context of wireless communications systems. A process flow is then provided to illustrate aspects of the disclosure. Aspects of the disclosure are further illustrated by and described with reference to apparatus diagrams, system diagrams, and flowcharts that relate to WUS configurations for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, a base station 105 may transmit a WUS to a UE 115 using certain time-frequency resources of a downlink channel (e.g., PDCCH or NPDCCH). If the UE 115 wakes up from a sleep state and detects the WUS, the UE 115 may remain in the wake up state in order to monitor the downlink channel for a paging message (e.g., transmitted by base station 105) during a paging occasion. Alternatively, if the UE 115 wakes up from the sleep state but does not detect the WUS, there may not be a paging message for the UE 115 in the downlink channel, and the UE 115 may revert back to the sleep state. In some cases, the UE 115 may remain in the wakeup state after detecting the WUS and monitor the downlink channel for the paging message in the paging occasion until expiration of a maximum duration of the WUS.

As described herein, the maximum duration of the WUS may extend until the end of the WUS. If the UE 115 does not detect the WUS before the maximum duration of the WUS ends, the UE 115 may revert back to the sleep state. If the UE 115 does detect the WUS before the end of the maximum duration of the WUS, the UE 115 may monitor the subsequent downlink channel for scheduling information specific to the UE 115. Consequently, if the UE 115 does not receive the scheduling information (e.g., including a UE identification (ID) of the UE 115) in the downlink channel, the UE 115 may revert back to the sleep state. Alternatively, if the UE 115 does receive the scheduling information, the UE 115 may monitor a successive downlink channel (e.g., physical downlink shared channel (PDSCH) or narrowband PDSCH (NPDSCH)) for the data, paging message, and/or control information. A base station 105 may configure the maximum duration for the WUS and indicate the maximum duration to the UE 115 (e.g., via a SIB) on a carrier (e.g., a NB-IoT carrier) prior to transmitting the WUS. In some cases, the base station 105 may configure the WUS maximum duration specific to the carrier.

In some examples, the actual WUS transmission duration may be shorter than the maximum duration for a WUS. This shorter WUS transmission duration may be aligned to the start of the configured maximum duration of a WUS or may be aligned to the end of the configured maximum duration of a WUS. Additionally or alternatively, there may be a non-zero time gap between the end of the maximum configured WUS duration and an associated paging occasion. In some examples, this time gap between the end of a WUS and the paging occasion may be predefined. In other examples, this time gap may be dynamically configurable. The base station 105 may indicate a configurable time gap value to the UE 115 explicitly. Alternatively, the base station 105 may indicate a configurable time gap value to the UE 115 implicitly through other configured parameters.

In some cases, a list of possible maximum durations for a WUS may be defined, and the base station 105 may indicate an index to the UE 115 that corresponds to a specific maximum duration for the WUS from the list of possible maximum durations in the SIB (e.g., the SIB that indicates the maximum duration as described above). In some cases, multiple lists may be defined for possible maximum durations for the WUS. For example, the lists of the maximum durations may depend on a maximum number of repetitions value ($R_{max}$) for an associated control channel (e.g., an NPDCCH), and the base station 105 may specify the number of lists for the possible maximum durations. Alternatively, the base station 105 may define a single list of possible maximum durations for all $R_{max}$ values.

$R_{max}$ may indicate the maximum number of repetitions for the downlink channel in a paging occasion after a WUS ends. Additionally or alternatively, $R_{max}$ may indicate the possible locations for the downlink channel repetitions in the paging occasion. In some cases, $R_{max}$ may depend on a coverage area associated with the base station 105. For example, larger coverage areas may correspond to a larger $R_{max}$, and a smaller coverage area may correspond to a smaller $R_{max}$. In some examples, $R_{max}$ may be configured by a higher layer and indicated to the UE 115 in a broadcast signal (e.g., SIB). Alternatively, the value of $R_{max}$ may be known or indicated through legacy signaling (e.g., via SIB2).

In some examples, the $R_{max}$ used for a common search space (e.g., a type1-NPDCCH common search space) may be replaced with a higher layer configured parameter indicating a repetition number of NPDCCHs for a paging message. In some cases, the base station 105 may transmit a smaller number of repetitions (R) than $R_{max}$ in a given paging occasion. The UE 115 may not know R before monitoring the paging occasion and may determine the R value based on monitoring the possible locations for a downlink channel repetition in the paging occasion. R may correspond to the number of repetitions the base station 105 transmits and the UE 115 monitors such that the value R may be less than or equal to the value of $R_{max}$. Table 1 shows the possible values of R for each $R_{max}$.

TABLE 1

Type-1 NPDCCH Common Search Space Candidates

| | | | | | | | | | Narrowband Control Channel Element (NCCE) indices of monitored NPDCCH candidates | |
|---|---|---|---|---|---|---|---|---|---|---|
| $R_{max}$ | | | | R | | | | | L' = 1 | L' = 2 |
| 1 | 1 | — | — | — | — | — | — | — | — | {0, 1} |
| 2 | 1 | 2 | — | — | — | — | — | — | — | {0, 1} |
| 4 | 1 | 2 | 4 | — | — | — | — | — | — | {0, 1} |
| 8 | 1 | 2 | 4 | 8 | — | — | — | — | — | {0, 1} |
| 16 | 1 | 2 | 4 | 8 | 16 | — | — | — | — | {0, 1} |
| 32 | 1 | 2 | 4 | 8 | 16 | 32 | — | — | — | {0, 1} |
| 64 | 1 | 2 | 4 | 8 | 16 | 32 | 64 | — | — | {0, 1} |
| 128 | 1 | 2 | 4 | 8 | 16 | 32 | 64 | 128 | — | {0, 1} |
| 256 | 1 | 4 | 8 | 16 | 32 | 64 | 128 | 256 | — | {0, 1} |
| 512 | 1 | 4 | 16 | 32 | 64 | 128 | 256 | 512 | — | {0, 1} |
| 1024 | 1 | 8 | 32 | 64 | 128 | 256 | 512 | 1024 | — | {0, 1} |
| 2048 | 1 | 8 | 64 | 128 | 256 | 512 | 1024 | 2048 | — | {0, 1} |
| Downlink Control Indication (DCI) subframe repetition number | 000 | 001 | 010 | 011 | 100 | 101 | 110 | 111 | | |

In some cases, the UE 115 may not explicitly know the duration of the WUS and may miss one or more of the repetitions, R, before starting to monitor for scheduling information or the paging message, thereby reducing the chance of correctly receiving the paging message.

Wireless communications system 100 may support efficient techniques for determining a duration for the WUS. In some cases, the UE 115 may assume a maximum duration for the WUS based on variables associated with the base station 105 and WUS. For example, the maximum duration for the WUS may depend on a transmission power of the WUS, a transmission diversity used by the base station for the WUS, or whether the WUS may be detected prior to the detection of legacy synchronization signals, or any combination thereof. Additionally, the UE 115 may determine to terminate the WUS at an earlier time than the maximum duration based on a required duration signaled by the base station 105, a signal quality, etc. The UE 115 may determine this shorter duration independent or instead of a maximum duration.

Figure 2:
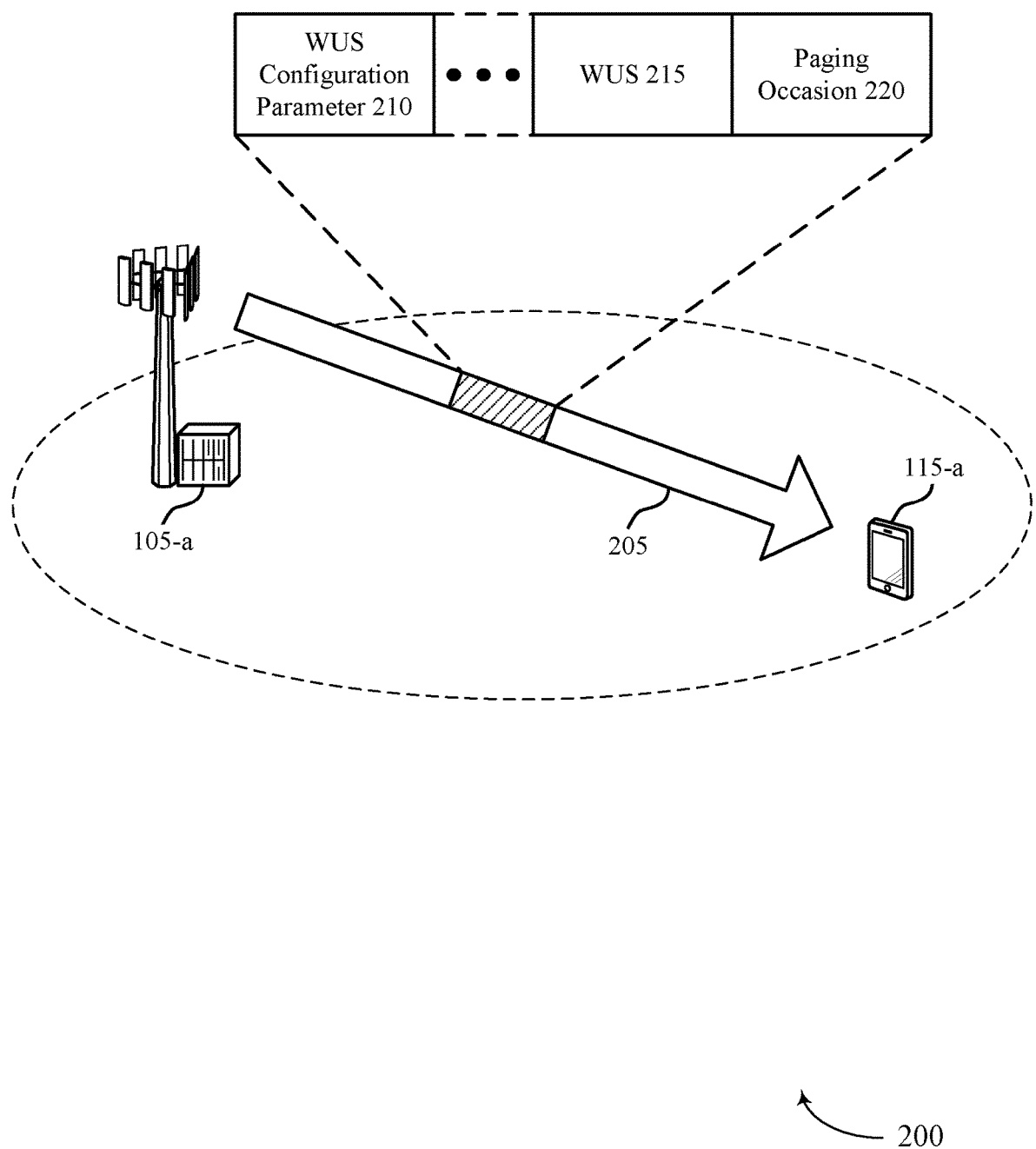
FIG. 2 illustrates an example of a wireless communications system that supports WUS configurations for wireless communications in accordance with aspects of the present disclosure.

FIG. 2 illustrates an example of a wireless communications system 200 that supports WUS configurations for wireless communications in accordance with various aspects of the present disclosure. In some examples, wireless communications system 200 may implement aspects of wireless communications system 100. Wireless communications system 200 may include a base station 105-a and a UE 115-a, which may be examples of a base station 105 and UE 115, respectively, as described with reference to FIG. 1. UE 115-a may be in communication with base station 105-a. In some examples, base station 105-a may transmit a WUS 215 and a paging occasion 220 indicating potential data and/or control information for UE 115-a, which may be transmitted on resources of a downlink channel 205 (e.g., a PDCCH or NPDCCH).

In some cases, UE 115-a may wake up and monitor for WUS 215 on downlink channel 205 (or a different downlink channel) for scheduling information specific to UE 115-a (e.g., including a UE ID for UE 115-a) in order to monitor for a paging message during paging occasion 220, which may be after expiration of a maximum duration of WUS 215. If UE 115-a does not detect WUS 215 before the expiration of the maximum duration, does not receive the scheduling information, or does not detect or receive the paging message in paging occasion 220, UE 115-a may revert back to a sleep state. In some cases, the sleep state may be a discontinuous reception (DRX) cycle off state between two DRX cycles, where UE 115-a is awake and monitoring for WUS 215 during the DRX cycles. Alternatively, if UE 115-a does detect WUS 215 before the expiration of the maximum duration and receives the associated scheduling information, UE 115-a may monitor a successive downlink channel 205 (e.g., PDSCH or NPDSCH) for data, the paging message, and/or control information. In some cases, UE 115-a may remain in the wakeup state after detecting the WUS and monitor downlink channel 205 for the paging message in paging occasion 220 until expiration of a maximum duration of WUS 215. Base station 105-a may configure the maximum duration for WUS 215 and indicate the maximum duration to UE 115-a (e.g., via a SIB) on a carrier (e.g., an NB-IoT carrier) prior to transmitting WUS 215. The maximum duration may be indicated via a downlink message, such as a WUS configuration parameter 210. In some cases, base station 105-a may configure a maximum duration for WUS 215 specific to the carrier. Additionally, WUS configuration parameter 210 may include further information about WUS 215 (e.g., $R_{max}$)

In some cases, UE 115-a may assume a maximum duration ($W_{max}$) for WUS 215 based on $R_{max}$ or based on variables associated with base station 105-a and WUS 215, rather than receiving it via the downlink message. For example, $W_{max}$ may depend on a transmission power of WUS 215, a transmission diversity used by base station 105-a for WUS 215, whether WUS 215 may be detected prior to the detection of legacy synchronization signals, or any combination thereof. This dependency may be represented by a scaling factor $K_W$. In one example, UE 115-a may determine $W_{max}$ based on a relationship between $R_{max}$ and $K_W$, as shown by Equation 1 as follows:

$$W_{max} = (R_{max}/K_w) \qquad (1)$$

Further, the values of $W_{max}$ may be given as shown below in Table 2.

TABLE 2

Possible $W_{max}$ Values

| $R_{max}$ | $W_{max}$ | | | | | | | |
|---|---|---|---|---|---|---|---|---|
| 1 | 1 | 1 | 1 | 1 | 1 | 1 | 1 | 1 |
| 2 | 2 | 1 | 1 | 1 | 1 | 1 | 1 | 1 |
| 4 | 4 | 2 | 1 | 1 | 1 | 1 | 1 | 1 |
| 8 | 8 | 4 | 2 | 1 | 1 | 1 | 1 | 1 |
| 16 | 16 | 8 | 4 | 2 | 1 | 1 | 1 | 1 |
| 32 | 32 | 16 | 8 | 4 | 2 | 1 | 1 | 1 |
| 64 | 64 | 32 | 16 | 8 | 4 | 2 | 1 | 1 |
| 128 | 128 | 64 | 32 | 16 | 8 | 4 | 2 | 1 |
| 256 | 256 | 128 | 64 | 32 | 16 | 8 | 4 | 2 |
| 512 | 512 | 256 | 128 | 64 | 32 | 16 | 8 | 4 |
| 1024 | 1024 | 512 | 256 | 128 | 64 | 32 | 16 | 8 |
| 2048 | 2048 | 1024 | 512 | 256 | 128 | 64 | 32 | 16 |
| Scaling Factor $K_W$ | 1 | 2 | 4 | 8 | 16 | 32 | 64 | 128 |

For example, for an $R_{max}$=512 and $K_W$=8, $W_{max}$=64 (i.e., 512/8=64). In some cases, $W_{max}$ may be given in terms of a number of fixed units (e.g., in time) such as a subframe, slot, mini-slot, etc.

In some cases, base station 105-a may indicate the value of $K_W$ to UE 115-a in a SIB explicitly (e.g., in WUS configuration parameter 210). Additionally or alternatively, base station 105-a may indicate two values for $K_W$ in WUS configuration parameter 210 (e.g., based on whether the transmission diversity for WUS 215 is either on or off). There may be a $K_{W1}$ that corresponds to WUS 215 if the transmission diversity for WUS 215 is on, and a $K_{W0}$ that corresponds to WUS 215 if the transmission diversity is off. The transmission diversity may indicate a number of antenna ports used for transmission of WUS 215. Accordingly, when the transmission diversity is on, the indicated antenna ports may be used for transmitting WUS 215. Alternatively, when the transmission diversity is off, a subset of the indicated antenna ports or a different number of antenna ports may be used for transmitting WUS 215. Tables 3 and 4 below show values for $K_{W0}$ and $K_{W1}$, respectively, and values for $W_{max}$.

TABLE 3

$W_{max}$ Values for $K_{W0}$

| $R_{max}$ | $W_{max}$ | | | | |
|---|---|---|---|---|---|
| 1 | 1 | 1 | 1 | 1 | 1 |
| 2 | 2 | 1 | 1 | 1 | 1 |
| 4 | 4 | 2 | 1 | 1 | 1 |
| 8 | 8 | 4 | 2 | 1 | 1 |
| 16 | 16 | 8 | 4 | 2 | 1 |
| 32 | 32 | 16 | 8 | 4 | 2 |
| 64 | 64 | 32 | 16 | 8 | 4 |
| 128 | 128 | 64 | 32 | 16 | 8 |
| 256 | 256 | 128 | 64 | 32 | 16 |
| 512 | 512 | 256 | 128 | 64 | 32 |
| 1024 | 1024 | 512 | 256 | 128 | 64 |
| 2048 | 2048 | 1024 | 512 | 256 | 128 |
| Scaling Factor $K_{W0}$ | 1 | 2 | 4 | 8 | 16 |

TABLE 4

$W_{max}$ Values for $K_{W1}$

| $R_{max}$ | $W_{max}$ | | | | |
|---|---|---|---|---|---|
| 1 | 1 | 1 | 1 | 1 | 1 |
| 2 | 1 | 1 | 1 | 1 | 1 |
| 4 | 1 | 1 | 1 | 1 | 1 |
| 8 | 1 | 1 | 1 | 1 | 1 |
| 16 | 2 | 1 | 1 | 1 | 1 |
| 32 | 4 | 2 | 1 | 1 | 1 |
| 64 | 8 | 4 | 2 | 1 | 1 |
| 128 | 16 | 8 | 4 | 2 | 1 |
| 256 | 32 | 16 | 8 | 4 | 2 |
| 512 | 64 | 32 | 16 | 8 | 4 |
| 1024 | 128 | 64 | 32 | 16 | 8 |
| 2048 | 256 | 128 | 64 | 32 | 16 |
| Scaling Factor $K_{W1}$ | 8 | 16 | 32 | 64 | 128 |

In some cases, UE 115-a may assume an actual duration (W) of WUS 215 for a blind detection of WUS 215. W may indicate an early termination of WUS 215 (e.g., before the end of the configured or calculated maximum duration of WUS 215). UE 115-a may further assume a relationship between the calculated $W_{max}$ and W, which may indicate a duration that UE 115-a will first listen to WUS 215 before terminating the first listening (e.g., to reduce power consumption resulting from listening for a maximum WUS duration) and then start listening to paging occasion 220. Additionally or alternatively, if UE 115-a does not detect WUS 215 before W expires, UE 115-a may revert back to the sleep state earlier than the expiration of $W_{max}$. The relationship may be similar to the relationship between R and $R_{max}$ as shown above in Table 1. Table 5 shows the possible values of W for a calculated $W_{max}$.

TABLE 5

Possible W Values

| $W_{max}$ | W | | | | | | | |
|---|---|---|---|---|---|---|---|---|
| 1 | 1 | — | — | — | — | — | — | — |
| 2 | 1 | 2 | — | — | — | — | — | — |
| 4 | 1 | 2 | 4 | — | — | — | — | — |
| 8 | 1 | 2 | 4 | 8 | — | — | — | — |
| 16 | 1 | 2 | 4 | 8 | 16 | — | — | — |
| 32 | 1 | 2 | 4 | 8 | 16 | 32 | — | — |
| 64 | 1 | 2 | 4 | 8 | 16 | 32 | 64 | — |
| 128 | 1 | 2 | 4 | 8 | 16 | 32 | 64 | 128 |
| 256 | 1 | 4 | 8 | 16 | 32 | 64 | 128 | 256 |
| 512 | 1 | 4 | 16 | 32 | 64 | 128 | 256 | 512 |
| 1024 | 1 | 8 | 32 | 64 | 128 | 256 | 512 | 1024 |
| 2048 | 1 | 8 | 64 | 128 | 256 | 512 | 1024 | 2048 |

In one example, W may be represented as $W_i$ where i represents an i-th UE 115. $W_i$ may be defined by Equation 2 as follows:

$$W_i = W_{max} \frac{R_i}{R_{max}} \quad (2)$$

In this equation, $R_i$ may be a downlink channel repetition number (e.g., an NPDCCH repetition number) required for UE 115-a, where UE 115-a is the i-th UE 115. In some cases, base station 105-a may signal $R_i$ (e.g., the values of R corresponding to different maximum coupling losses (MCLs) or signal-to-noise ratios (SNRs)) to UE 115-a in a SIB (e.g., WUS configuration parameter 210). Additionally or alternatively, $R_i$ may be counted by UE 115-a based on the determined R value from monitoring the possible locations for downlink channel 205 repetition in paging occasion 220 as described above (or from a previous WUS 215).

In a second example, UE 115-a (e.g., the i-th UE 115) may not have determined the value of $W_{max}$. Instead, UE 115-a may assume the $W_i$ as a function of $R_i$ and $K_W$, where $K_W$ is defined as described above. For example, UE 115-a may assume a relationship between $W_i$, $R_i$, and $K_W$ as follows in Equation 3:

$$W_i = \frac{R_i}{K_w} \quad (3)$$

The values of $W_i$ may be given as shown below in Table 6.

TABLE 6

Possible $W_i$ Values

| $R_i$ | $W_i$ | | | | | | | |
|---|---|---|---|---|---|---|---|---|
| 1 | 1 | 1 | 1 | 1 | 1 | 1 | 1 | 1 |
| 2 | 2 | 1 | 1 | 1 | 1 | 1 | 1 | 1 |
| 4 | 4 | 2 | 1 | 1 | 1 | 1 | 1 | 1 |
| 8 | 8 | 4 | 2 | 1 | 1 | 1 | 1 | 1 |
| 16 | 16 | 8 | 4 | 2 | 1 | 1 | 1 | 1 |
| 32 | 32 | 16 | 8 | 4 | 2 | 1 | 1 | 1 |
| 64 | 64 | 32 | 16 | 8 | 4 | 2 | 1 | 1 |
| 128 | 128 | 64 | 32 | 16 | 8 | 4 | 2 | 1 |
| 256 | 256 | 128 | 64 | 32 | 16 | 8 | 4 | 2 |
| 512 | 512 | 256 | 128 | 64 | 32 | 16 | 8 | 4 |
| 1024 | 1024 | 512 | 256 | 128 | 64 | 32 | 16 | 8 |
| 2048 | 2048 | 1024 | 512 | 256 | 128 | 64 | 32 | 16 |
| Scaling Factor $K_W$ | 1 | 2 | 4 | 8 | 16 | 32 | 64 | 128 |

For example, for an $R_i$=1024 and $K_W$=32, $W_i$=32 (i.e., 1024/32=32). In some cases, $W_i$ may be given in terms of a number of subframes. In this example, UE 115-a may implicitly derive $W_{max}$ for WUS 215. Accordingly, UE 115-a may estimate $W_{max}$ for WUS 215 based on $R_i$ and $W_i$. For example, UE 115-a may assume a relationship as represented by Equation 4 for $W_{max}$ as follows:

$$W_{max} = W_i \frac{R_{max}}{R_i} \quad (4)$$

In some cases, the value of $W_{max}$ may not impact early termination behavior. For example, the $W_{max}$ value of for UE 115-a may not impact the value of $W_i$ for UE 115-a. UE 115-a may estimate $W_{max}$ according to Equation 4 based on an inverse equivalent of Table 1 for possible $R_{max}$ values based on $R_i$ as shown in Table 7 below.

TABLE 7

Possible $R_{max}$ Values

| $R_i$ | $R_{max}$ | | | | | | | | | | | |
|---|---|---|---|---|---|---|---|---|---|---|---|---|
| 1 | 1 | 2 | 4 | 8 | 16 | 32 | 64 | 128 | 256 | 512 | 1024 | 2048 |
| 2 | — | 2 | 4 | 8 | 16 | 32 | 64 | 128 | — | — | — | — |
| 4 | — | — | 4 | 8 | 16 | 32 | 64 | 128 | 256 | 512 | — | — |
| 8 | — | — | — | 8 | 16 | 32 | 64 | 128 | 256 | — | 1024 | 2048 |
| 16 | — | — | — | — | 16 | 32 | 64 | 128 | 256 | 512 | — | — |
| 32 | — | — | — | — | — | 32 | 64 | 128 | 256 | 512 | 1024 | — |
| 64 | — | — | — | — | — | — | 64 | 128 | 256 | 512 | 1024 | 2048 |
| 128 | — | — | — | — | — | — | — | 128 | 256 | 512 | 1024 | 2048 |
| 256 | — | — | — | — | — | — | — | — | 256 | 512 | 1024 | 2048 |
| 512 | — | — | — | — | — | — | — | — | — | 512 | 1024 | 2048 |
| 1024 | — | — | — | — | — | — | — | — | — | — | 1024 | 2048 |
| 2048 | — | — | — | — | — | — | — | — | — | — | — | 2048 |

In some cases, the MCL for WUS 215 may be large (e.g., greater than or equal to 154 decibels (dBs)) such that an early termination may be used for WUS 215. In this case, a transmission diversity for WUS 215 may be used for transmitting WUS 215. Accordingly, a maximum value determined between $W_i$ and a minimum duration to achieve the transmission diversity (e.g., 2× in case of a transmit diversity dimension equal to 2) may be indicated as a length for WUS 215 for early UE 115-a termination. Base station 105-a may change a transmission diversity scheme for WUS 215 every X fixed units (e.g., subframes, slots).

Alternatively, UE 115-a may determine not to monitor WUS 215 for the maximum WUS 215 duration and may engage in an early termination based on this determination. That is, UE 115-a may monitor WUS 215 for a time $W_i$ (e.g., shorter than $W_{max}$ that corresponds to the entire, maximum duration of WUS 215) as described above. UE 115-a may decide a value for $W_i$ such that it meets a certain probability of detection of WUS 215 prior to the early termination. This value may depend on parameters such as a signal quality which may be indicated or based on an SNR from a narrowband reference signal (NRS) or a cell-specific reference signal (CRS). As such, UE 115-a may determine how long to accumulate WUS 215 (based on the signal quality) in order to meet the certain probability of detection of WUS 215. Additionally, the value for $W_i$ may be based on the transmit diversity scheme used for WUS 215, a power boosting used for WUS 215, etc.

In some cases, base station 105-a may signal a required duration $W_i$ for UE 115-a to monitor WUS 215 based on an SNR or MCL corresponding to the given repetition level (e.g., $R_i$) for downlink channel 205. For example, UE 115-a may measure a −10 dB SNR. Accordingly, UE 115-a may determine 16 subframes are needed to decode downlink channel 205. This determination may be known from the NRS/CRS SNR since a transmission scheme for downlink channel 205 is predefined or fixed. Based on this determination, the subframes for WUS 215 may also be predefined or fixed. For example, UE 115-a may monitor WUS 215 for two subframes. Alternatively, base station 105-a may indicate UE 115-a to monitor WUS 215 for two subframes.

Additionally or alternatively, base station 105-a may signal a "transmit scheme" to be utilized for WUS 215. In some cases, base station 105-a may signal how many degrees of transmit diversity used. For example, base station 105-a may signal whether it switches across 1, 2, 4, or 8 orthogonal directions, if power boosting is utilized, etc. Based on this information, UE 115-a may determine the value of $W_i$.

In some cases, base station 105-a may not signal a $K_W$ value to UE 115-a in WUS configuration parameter 210. Instead, base station 105-a may indicate parameters of an additional scaling factor ($\beta_W$) and a power boosting ratio ($P_W$) in a SIB. $\beta_W$ may depend on a transmission diversity dimension. A ratio of an energy per resource element (EPRE) for WUS 215 to an EPRE for NRS may be represented with $P_W$. Additionally or alternatively, UE 115-a may determine $P_W$ by a power offset parameter for WUS 215 (nrs-WUS-PowerOffset), which may be provided by higher layers and indicated in the SIB. In some cases, nrs-WUS-PowerOffset may be −3 dB, 0 dB, 3 dB, or 6 dB. Additionally or alternatively, a cell-specific power offset (nrs-CRS-PowerOffset) may also be provided by base station 105-a. For example, when WUS 215 is used for certain types of communications (e.g., MTC), UE 115-a may assume (e.g., with no higher layer signaling) a predefined (e.g., fixed) power relationship or power boosting offset between the EPRE for WUS 215 relative to that of a CRS with a different number of antenna ports. Additionally, the power relationship or power boosting offset may include a fixed power ratio between a reference signal (e.g., the CRS) and WUS 215 when no higher layer signaling is received by UE 115-a. For example, UE 115-a may assume the EPRE for WUS 215 is the same as the EPRE for NRS. The value of $P_W$ may further depend on the number of NRS antenna ports of base station 105-a. For example, UE 115-a may assume that $P_W$ is [0+(nrs-WUS-PowerOffset)] dB if base station 105-a has one antenna port and that $P_W$ is [−3+(nrs-WUS-PowerOffset)] dB if base station 105-a has two antenna ports. In some cases, $P_W$ may be assumed to be 0 dB if the parameter (nrs-WUS-PowerOffset) is not provided by higher layers. UE 115-a may calculate $W_{max}$ based on $R_{max}$, $\beta_W$, and $P_W$ using Equation 5 as follows:

$$W_{max} = \frac{R_{max}}{\beta_w * P_w} \quad (5)$$

In this equation, $\beta_W$ may be 1, 2, or 4 depending on the WUS 215 transmission diversity dimension. UE 115-a may assume that the antenna port(s) for base station 105-a are quasi-co-located antenna port(s) with respect to the average delay or Doppler shift. Base station 105-a may change the transmission diversity scheme to improve WUS 215 detection. For example, base station 105-a may precode cycling or antenna switches. In another example, base station 105-a may indicate that for X time units (e.g., X subframes), WUS 215 may use the antenna port 0 or the antenna port 1 (e.g., with respect to sharing the same channel delay spread). Assuming same channel characteristics within the X time units, UE 115-a may be able to make a coherent detection for WUS 215.

In some cases, base station 105-a may indicate the parameters for the transmission scheme of WUS 215. Accordingly, UE 115-a may use these parameters for detecting WUS 215. In one example, base station 105-a may indicate a transmission pattern index that indicates the individual parameters. In other examples, base station 105-a may indicate individual parameters explicitly. Base station 105-a may indicate these individual parameters through parameters (X, Y), where X may be a configurable or fixed unit of time (e.g., subframe, slot). For example, X may indicate X subframes during which UE 115-a may assume that WUS 215 may be sent on the same antenna or antenna port and may perform coherent combining based on the antenna/antenna port assumption. Y may indicate the configurable diversity dimension(s) to UE 115-a. For example, base station 105-a may indicate that WUS 215 may switch through Y antennas or antenna ports per predefined unit (e.g., a subframe). Table 8 may indicate a number of antenna port indices for a given pattern based on the parameters (X,Y).

TABLE 8

Antenna Port Index for a Given Pattern

| Pattern | Y | X | Antenna Port Index per Subframe |
|---------|---|---|---------------------------------|
| 0 | 1 | — | 0000000000 . . . |
| 1 | 2 | 1 | 0101010101 . . . |
| 2A | 2 | 2 | 0011001100 . . . |
| 2B | 2 | 4 | 0000111100 . . . |
| 3 | 2 | 1 and 2 | 0100110011 . . . |
| 4 | 2 | 1 and 4 | 0100001111 . . . |
| 5 | 4 | 1 | 0123012301... |

Depending on whether WUS 215 is aligning to the start or end of a time period (e.g., subframe), UE 115-a may monitor the beginning of the time period for WUS 215 and early terminate the monitoring, or UE 115-a may start monitoring WUS 215 later (e.g., after a time duration past the beginning of the time period) to shorten WUS 215 detection. For example, if the pattern 3A from Table 8 is indicated and WUS 215 is aligning to the start of the time period, base station 105-a may send the repeated WUS sequences according to the order of pattern 3A as '0100110011 . . . '. If MCL=154 dB for UE 115-a, UE 115-a may need to detect the first 2 subframes (i.e., the '01'); however, if MCL= 164 dB, UE 115-a may need to detect the entire '0100110011 . . . ' in order for WUS 215 to be successfully detected. In another example, if the pattern 3A from Table 8 is indicated and WUS 215 is aligning to the end, base station 105-a may send the repeated WUS sequences according to the reverse order of pattern 3A as ' . . . 1100110010'. If MCL=154 dB, UE 115-a may start to monitor later and need to detect the last 2 subframes (i.e., the '10'); however, if MCL=164 dB, UE 115-a may start to monitor earlier and need to detect the entire ' . . . 1100110010' in order for WUS 215 to be successfully detected.

Figure 3:
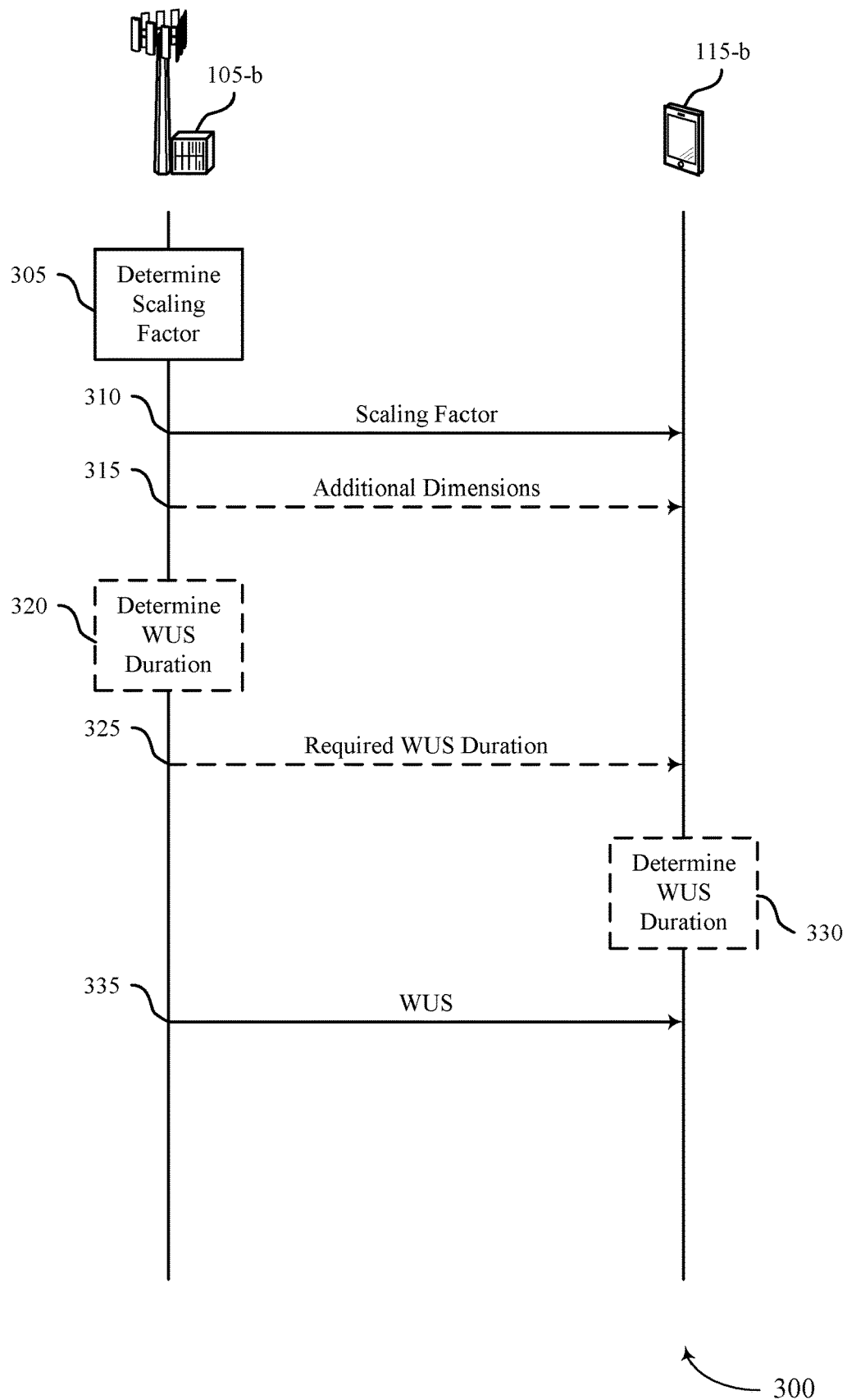
FIG. 3 illustrates an example of a process flow that supports WUS configurations for wireless communications in accordance with aspects of the present disclosure.

FIG. 3 illustrates an example of a process flow 300 that supports WUS configurations for wireless communications in accordance with various aspects of the present disclosure. In some examples, process flow 300 may implement aspects of wireless communications systems 100 and 200. Process floe may include a base station 105-b and a UE 115-b, which may be examples of a base station 105 and a UE 115, respectively, as described with reference to FIGS. 1 and 2. Base station 105-b may transmit a WUS to UE 115-b prior to transmitting scheduling information and/or a paging message. In some cases, base station 105-b or UE 115-b may determine a duration for the WUS as described herein.

In the following description of the process flow 300, the operations between UE 115-b and base station 105-b may be performed in different orders or at different times. Certain operations may also be left out of the process flow 300, or other operations may be added to the process flow 300. It is to be understood that while base station 105-b and UE 115-b are shown performing a number of the operations of process flow 300, any wireless device may perform the operations shown.

At 305, base station 105-b may determine a scaling factor (e.g., $K_W$) associated with a WUS, where the scaling factor is based on a transmission characteristic for the WUS. In some cases, the transmission characteristic may include a transmit power for the WUS, a transmit diversity scheme for the WUS, a legacy synchronization signal detection of UE 115-b before WUS detection, a power ratio between the WUS and an NRS, an MCL associated with UE 115-b, or a combination thereof. The power ratio may include an EPRE power ratio. In some cases, an SNR may be determined based on a power ratio between the WUS and a narrowband reference signal, where a single port SNR is estimated for the WUS based on the SNR. Additionally, the transmit diversity scheme may include a pattern index of fixed patterns, with each pattern defining a number of fixed basic units and a transmit diversity dimension, or may include the number of fixed basic units and the transmit diversity dimension. Additionally, the fixed basic unit may include a number of subframes, a 1 ms TTI, a slot, or a mini-slot. Additionally or alternatively, the scaling factor may be determined based on identifying an SNR for UE 115-b.

At 310, base station 105-b may transmit an indication of the scaling factor to UE 115-b. In some cases, base station 105-b may transmit a SIB that includes the indication of the scaling factor, a value of the scaling factor, a power offset parameter that indicates a power ratio between a narrowband reference signal and the WUS, or a combination thereof. In some cases, the power ratio between the narrowband reference signal and the WUS may be predefined or fixed (e.g., if no higher layer signaling is received). Additionally or alternatively, for MTC, the power ratio may be fixed (e.g., predefined) as a ratio between a cell-specific reference signal and the WUS (e.g., if no higher layer signaling is received), where the WUS is associated with the MTC. The indication of the scaling factor may include a transmit scheme for the WUS. In some cases, UE 115-b may determine the scaling factor associated with the WUS based on the transmit scheme.

At 315, base station 105-b may transmit additional characteristics to UE 115-b concerning the WUS. For example, base station 105-b may transmit, to UE 115-b, a reference signal. In some cases, the reference signal may include a NRS or CRS. Additionally or alternatively, base station 105-b may transmit, to UE 115-b, an indication of a transmit diversity dimension for transmission of the WUS. In some cases, base station 105-b may determine the transmit diversity dimension based on a number of antennas switching on one antenna port every configured unit (e.g., two subframes) or a number of antenna ports switching on all antenna ports every configured unit (e.g., two subframes), where the configured unit includes a number of fixed basic units for WUS transmission. Additionally or alternatively, base station 105-b may transmit a maximum number of repetitions (e.g., $R_{max}$) of an associated narrowband control channel (e.g., NPDCCH) in a SIB.

At 320, base station 105-b may determine a duration (e.g., a WUS time duration) of the WUS (e.g., W or $W_i$) based on a relationship between the scaling factor and an associated control channel repetition parameter. In some cases, the duration of the WUS is based on a signal quality of the reference signal and a probability of detection threshold. Additionally or alternatively, the duration of the WUS may be determined based on a maximum duration of the WUS (e.g., via a table indicating the maximum duration of the WUS), a maximum number of repetitions (e.g., $R_{max}$) of an associated narrowband control channel (e.g., NPDCCH), a required number of repetitions of the associated narrowband control channel for UE 115-b, or a combination thereof. Additionally or alternatively, the duration of the WUS may be based on the maximum number of repetitions of the associated narrowband control channel. In some cases, the duration of the WUS may correspond to a maximum duration of the WUS (e.g., $W_{max}$). Accordingly, the associated control channel repetition parameter may correspond to a maximum number of repetitions of an associated narrowband control channel for paging.

At 325, base station may transmit, to UE 115-b, a required duration for the WUS (e.g., an indication of the WUS time duration), where the required duration is based on a target SNR or MCL associated with UE 115-b.

At 330, UE 115-b may determine a duration of the WUS (e.g., a WUS time duration) based on a relationship between the scaling factor and an associated control channel repetition parameter. UE 115-b may determine the duration of the WUS in addition to or alternatively to base station 105-b determining the duration of the WUS at 320. In some cases, UE 115-b may determine a reception duration for the WUS based on a signal quality of a reference signal and a probability of detection threshold. For example, the reception duration may be determined based on the transmission characteristic for the WUS. Additionally, UE 115-b may receive the reference signal from base station 105-b at 315 and measure the signal quality of the reference signal.

In some cases, UE 115-b may determine a maximum duration of the WUS (e.g., $W_{max}$) based on a ratio of the associated control channel repetition parameter and the scaling factor. Additionally or alternatively, UE 115-b may determine the duration of the WUS based on a maximum duration of the WUS, a maximum number of repetitions of transmissions on a narrowband control channel, a required number of repetitions of the associated narrowband control channel for UE 115-b, or a combination thereof. Additionally or alternatively, UE 115-b may determine the duration of the WUS based on the maximum number of repetitions of the transmissions on the narrowband control channel. In some cases, the duration of the WUS may correspond to a maximum duration of the WUS (e.g., $W_{max}$). Accordingly, the associated control channel repetition parameter may correspond to a maximum number of repetitions of an associated narrowband control channel for paging. Additionally, UE 115-b may determine an early termination duration based on a target SNR or an MCL associated with UE 115-b.

At 335, base station 105-b may transmit, to UE 115-b, the WUS in accordance with the transmission characteristic for the duration. Based on receiving the WUS, UE 115-b may monitor a downlink channel from the base station for scheduling information, where the scheduling information includes information for a paging message from the base station.

Figure 4:
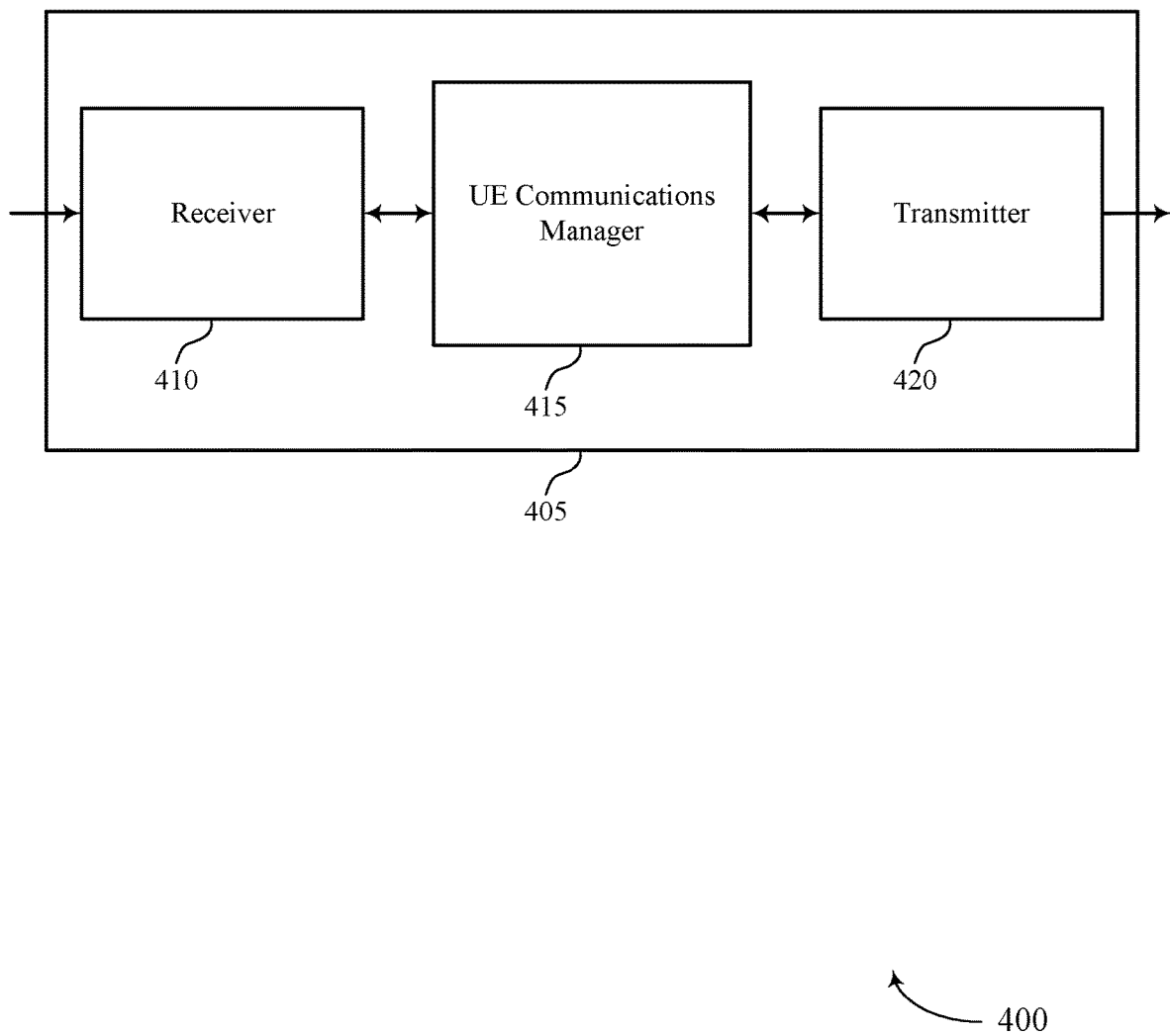
FIGS. 4 through 6 show block diagrams of a device that supports WUS configurations for wireless communications in accordance with aspects of the present disclosure.

FIG. 4 shows a block diagram 400 of a wireless device 405 that supports WUS configurations for wireless communications in accordance with aspects of the present disclosure. Wireless device 405 may be an example of aspects of a UE 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to WUS configurations for wireless communications, etc.). Information may be passed on to other components of the device. The receiver 410 may be an example of aspects of the transceiver 735 described with reference to FIG. 7. The receiver 410 may utilize a single antenna or a set of antennas.

UE communications manager 415 may be an example of aspects of the UE communications manager 715 described with reference to FIG. 7. UE communications manager 415 and/or at least some of its various sub-components may be implemented in hardware, software executed by a processor, firmware, or any combination thereof. If implemented in software executed by a processor, the functions of the UE communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive, from a base station, an indication of a scaling factor associated with a WUS, where the scaling factor is based on a transmission characteristic for the WUS. Additionally, UE communications manager 415 may receive, from the base station and for a WUS time duration, the WUS in accordance with the transmission characteristic, where the WUS time duration is determined based on the scaling factor and an associated control channel repetition parameter. In some cases, UE communications manager 415 may monitor a downlink channel from the base station for scheduling information based on the received WUS, where the scheduling information includes information for a paging message from the base station.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
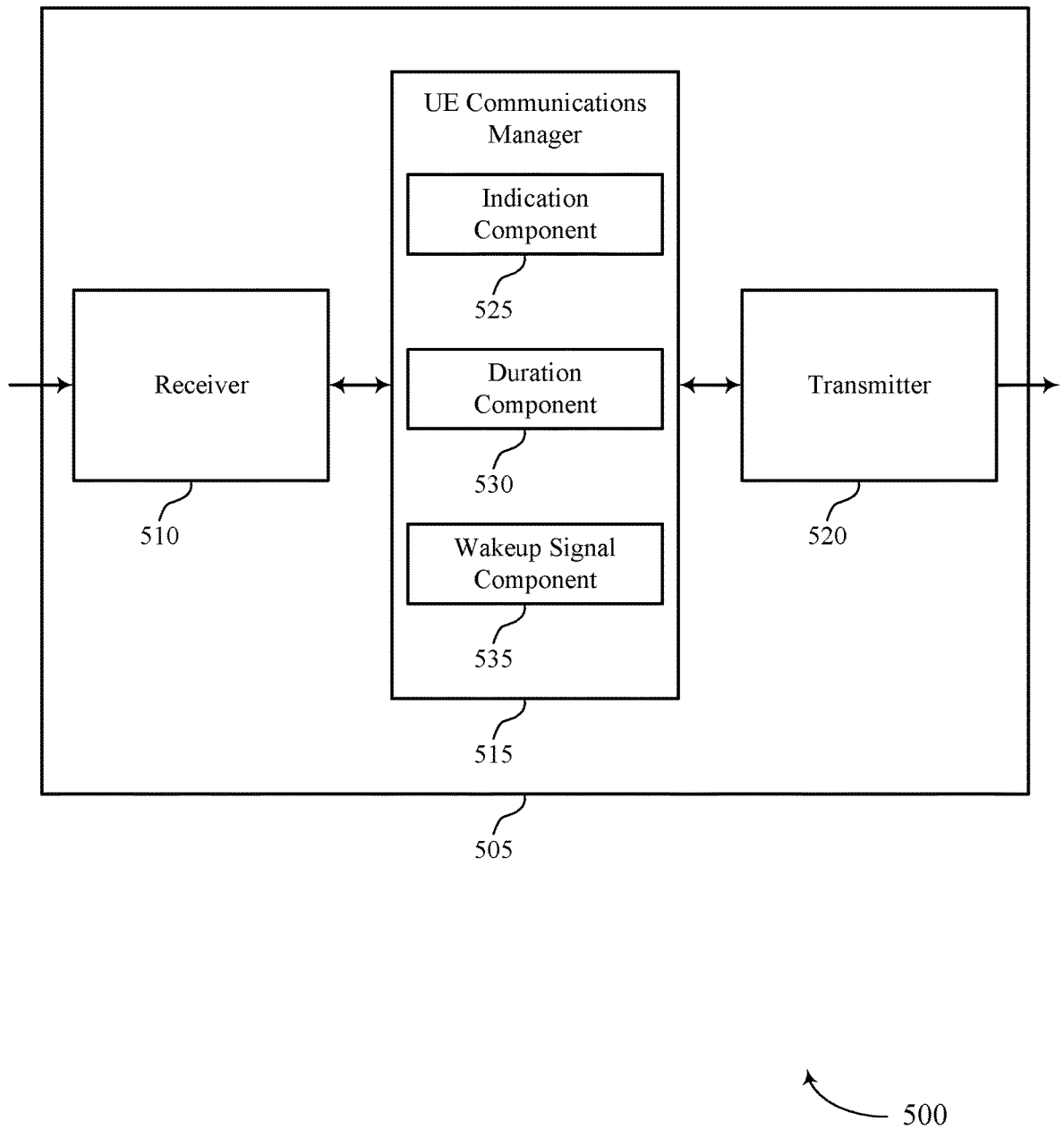

FIG. 5 shows a block diagram 500 of a wireless device 505 that supports WUS configurations for wireless communications in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to WUS configurations for wireless communications, etc.). Information may be passed on to other components of the device. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 may also include indication component 525, duration component 530, and WUS component 535.

Indication component 525 may receive, from a base station, an indication of a scaling factor associated with a WUS, where the scaling factor is based on a transmission characteristic for the WUS. Additionally, indication component 525 may determine the scaling factor associated with the WUS based on the transmit scheme. In some cases, the indication of the scaling factor includes a transmit scheme for the WUS. In some examples, receiving the indication of the scaling factor includes receiving a SIB that includes the indication of the scaling factor, a value of the scaling factor, or a combination thereof. Additionally, indication component 525 may receive a power offset parameter for the WUS in the SIB. In some cases, the power offset parameter may include a fixed power ratio between the narrowband reference signal and the WUS in an absence of higher layer signaling. Additionally or alternatively, the power offset parameter or a power relationship may include a fixed power ratio between a cell-specific reference signal and the WUS in the absence of higher layer signaling, where the WUS is associated with MTC.

In some aspects, the transmission characteristic may include a transmit power for the WUS, a transmit diversity scheme for the WUS, a legacy synchronization signal detection before WUS reception, a power ratio between the WUS and a narrowband reference signal, an MCL associated with the UE, or a combination thereof. Additionally or alternatively, an SNR may be determined based on a power ratio between the WUS and a narrowband reference signal, where a single port SNR is estimated for the WUS based on the SNR. In some instances, the power ratio includes an EPRE power ratio.

Duration component 530 may determine a WUS time duration based on a relationship between the scaling factor and an associated control channel repetition parameter (e.g., a maximum repetition of an associated control channel). Duration component 530 may receive, from the base station, a required duration for the WUS, where the duration of the WUS is determined based on the required duration for the WUS. Additionally, duration component 530 may receive a maximum number of repetitions of narrowband control channel transmissions in a SIB, where the duration of the WUS is determined based on the maximum number of repetitions of the narrowband control channel transmissions.

In some cases, determining the duration of the WUS includes determining a reception duration for the WUS based on a signal quality of a reference signal and a probability of detection threshold. In some examples, the reception duration is determined based on the transmission characteristic for the WUS. In some aspects, determining the duration of the WUS may include determining a maximum duration of the WUS based on a ratio of the associated control channel repetition parameter and the scaling factor. In some instances, the duration of the WUS may be determined based on a maximum duration of the WUS (e.g., as indicated in a table for maximum durations of the WUS), a maximum number of repetitions of transmissions on an associated narrowband control channel, a required number of repetitions of the associated narrowband control channel for the UE, or a combination thereof.

In some cases, the duration of the WUS may correspond to a maximum duration of the WUS. In some examples, the associated control channel repetition parameter may correspond to a maximum number of repetitions of transmissions on a narrowband control channel for paging. In some aspects, determining the duration of the WUS may include determining an early termination duration based on a target SNR or an MCL associated with the UE.

WUS component 535 may receive, from the base station and for the WUS time duration, the WUS in accordance with the transmission characteristic of the WUS. Additionally, WUS component 535 may monitor a downlink channel from the base station for scheduling information based on the received WUS, where the scheduling information includes information for a paging message from the base station.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
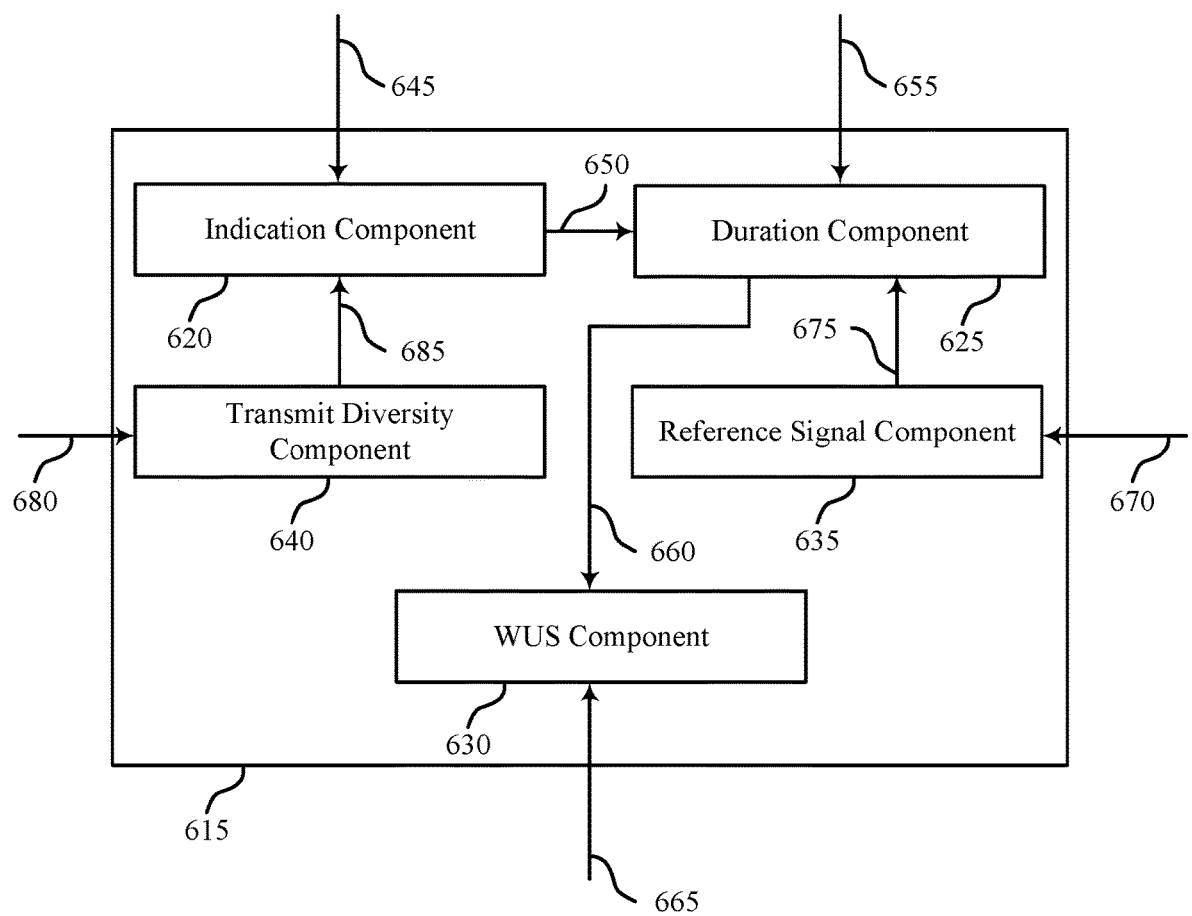

FIG. 6 shows a block diagram 600 of a UE communications manager 615 that supports WUS configurations for wireless communications in accordance with aspects of the present disclosure. The UE communications manager 615 may be an example of aspects of a UE communications manager 415, a UE communications manager 515, or a UE communications manager 715 described with reference to FIGS. 4, 5, and 7. The UE communications manager 615 may include indication component 620, duration component 625, WUS component 630, reference signal component 635, and transmit diversity component 640. Each of these modules may communicate, directly or indirectly, with one another (e.g., via one or more buses).

Indication component 620 may receive a signal 645 (e.g., via a receiver 410 or 510) from a base station. In some cases, the signal 645 may include an indication of a scaling factor associated with a WUS (e.g., by demodulating and decoding the signal 645 to identify the scaling factor), where the scaling factor is based on a transmission characteristic for the WUS. Additionally, indication component 620 determine the scaling factor associated with the WUS based on the transmit scheme. In some cases, the indication of the scaling factor includes a transmit scheme for the WUS. In some examples, receiving the indication of the scaling factor may include receiving a SIB that includes the indication of the scaling factor, a value of the scaling factor, or a combination thereof. Additionally, indication component 620 receive a power offset parameter for the WUS in the SIB. In some cases, the power offset parameter or a power relationship may include a fixed power ratio between the narrowband reference signal and the WUS in an absence of higher layer signaling. Additionally or alternatively, the power offset parameter may include a fixed power ratio between a cell-specific reference signal and the WUS in the absence of higher layer signaling, where the WUS is associated with MTC.

In some aspects, the transmission characteristic may include a transmit power for the WUS, a transmit diversity scheme for the WUS, a legacy synchronization signal detection before WUS reception, a power ratio between the WUS and a narrowband reference signal, an MCL associated with the UE, or a combination thereof. Additionally or alternatively, an SNR may be determined based on a power ratio between the WUS and a narrowband reference signal, where a single port SNR is estimated for the WUS based on the SNR. In some instances, the power ratio includes an EPRE power ratio. Indication component 620 may pass information 650 indicating the scaling factor to duration component 625.

Duration component 625 may determine a WUS time duration of the based on a relationship between the scaling factor and an associated control channel repetition parameter (e.g., a maximum repetition of an associated control channel). In some cases, duration component 625 may determine the duration of the WUS based on the information 650 received from the indication component 620. Duration component 625 may also receive a signal 655 (e.g., via the receiver 410 or 510) from the base station. In some cases, the signal 655 may include a required duration for the WUS, where the duration of the WUS is determined based on the required duration for the WUS. Additionally, the signal 655 that the duration component 625 receives may include an indication of a maximum number of repetitions of narrowband control channel transmissions in a SIB (e.g., by demodulating and decoding the signal 655 to determine the maximum number of repetitions), where the duration of the WUS is determined based on the maximum number of repetitions of the narrowband control channel transmissions.

In some cases, determining the duration of the WUS may include determining a reception duration for the WUS based on a signal quality of a reference signal and a probability of detection threshold. In some examples, the reception duration may be determined based on the transmission characteristic for the WUS. Additionally or alternatively, determining the duration of the WUS may include determining a maximum duration of the WUS based on a ratio of the associated control channel repetition parameter and the scaling factor. In some instances, the duration of the WUS may be determined based on a maximum duration of the WUS (e.g., as indicated in a table for maximum durations of the WUS), a maximum number of repetitions of an associated narrowband control channel, a required number of repetitions of the associated narrowband control channel for the UE, or a combination thereof.

In some cases, the duration of the WUS corresponds to a maximum duration of the WUS. In some cases, the associated control channel repetition parameter corresponds to a maximum number of repetitions of an associated narrowband control channel for paging. In some aspects, determining the duration of the WUS may include determining an early termination duration based on a target SNR or an MCL associated with the UE. Duration component 625 may pass information 660 indicating the determined duration to WUS component 630.

WUS component 630 may receive, from the base station and for the WUS time duration, a signal 665 (e.g., via the receiver 410 or 510). In some cases, the signal 665 may include the WUS in accordance with the transmission characteristic for the duration (e.g., by demodulating and decoding the signal 665 to identify the WUS). WUS component 630 may determine the duration for receiving the WUS based on the information 660 received from duration component 625. Additionally, WUS component 630 may monitor a downlink channel from the base station for scheduling information based on the received WUS, where the scheduling information includes information for a paging message from the base station.

Reference signal component 635 may receive a signal 670 from the base station (e.g., via the receiver 410 or 510). In some cases, the signal 670 may include the reference signal from the base station (e.g., by demodulating and decoding the signal 670 to identify the reference signal). Additionally, reference signal component 635 may measure the signal quality of the reference signal. Reference signal component 635 may pass information 675 indicating the reference signal to duration component 625, where duration component 625 determines the duration for the WUS based on the signal quality of the reference signal as noted above.

Transmit diversity component 640 may receive, from the base station, a signal 680 (e.g., via the receiver 410 or 510). In some cases, the signal 680 may include an indication of a transmit diversity dimension for transmission of the WUS. In some cases, the transmit diversity dimension is determined by a number of antennas switching on one antenna port every configured unit (e.g., two subframes) or by a number of antenna ports switching on all antenna ports every configured unit (e.g., two subframes), and where the configured unit includes a number of fixed basic units for WUS transmission. In some examples, the transmit diversity scheme includes a pattern index of fixed patterns, with each pattern defining a number of fixed basic units and a transmit diversity dimension or includes the number of fixed basic units and the transmit diversity dimension. In some aspects, the fixed basic unit includes a number of subframes, a 1 ms TTI, a slot, or a mini-slot. Transmit diversity component 640 may pass information 685 indicating the transmit diversity dimension to indication component 620, where indication component 620 determines the scaling factor in part based on the transmit diversity scheme for the WUS (e.g., transmit diversity dimension) as noted above.

Figure 7:
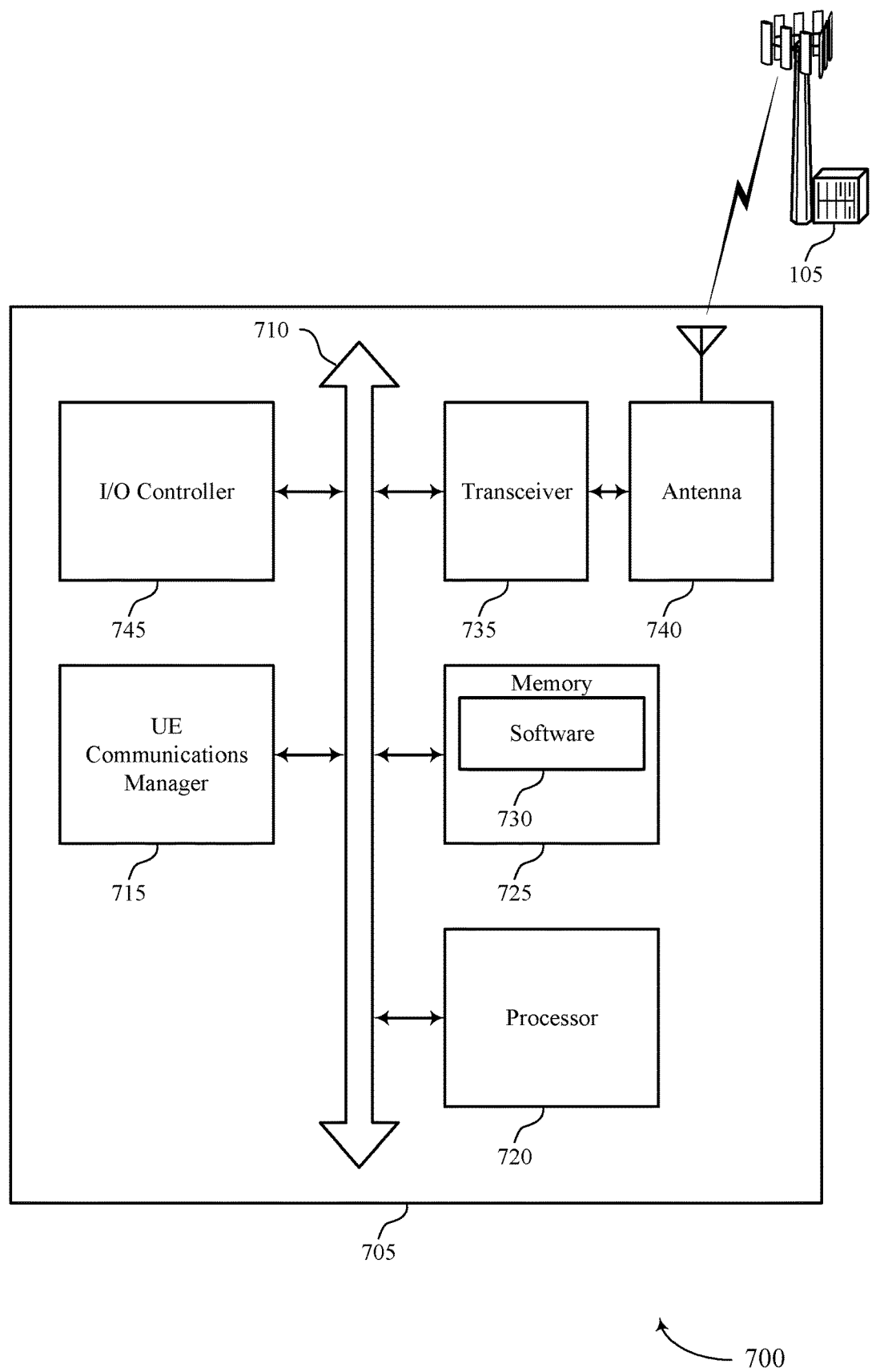
FIG. 7 illustrates a block diagram of a system including a UE that supports WUS configurations for wireless communications in accordance with aspects of the present disclosure.

FIG. 7 shows a diagram of a system 700 including a device 705 that supports WUS configurations for wireless communications in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting WUS configurations for wireless communications).

Memory 725 may include random-access memory (RAM) and read-only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support WUS configurations for wireless communications. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
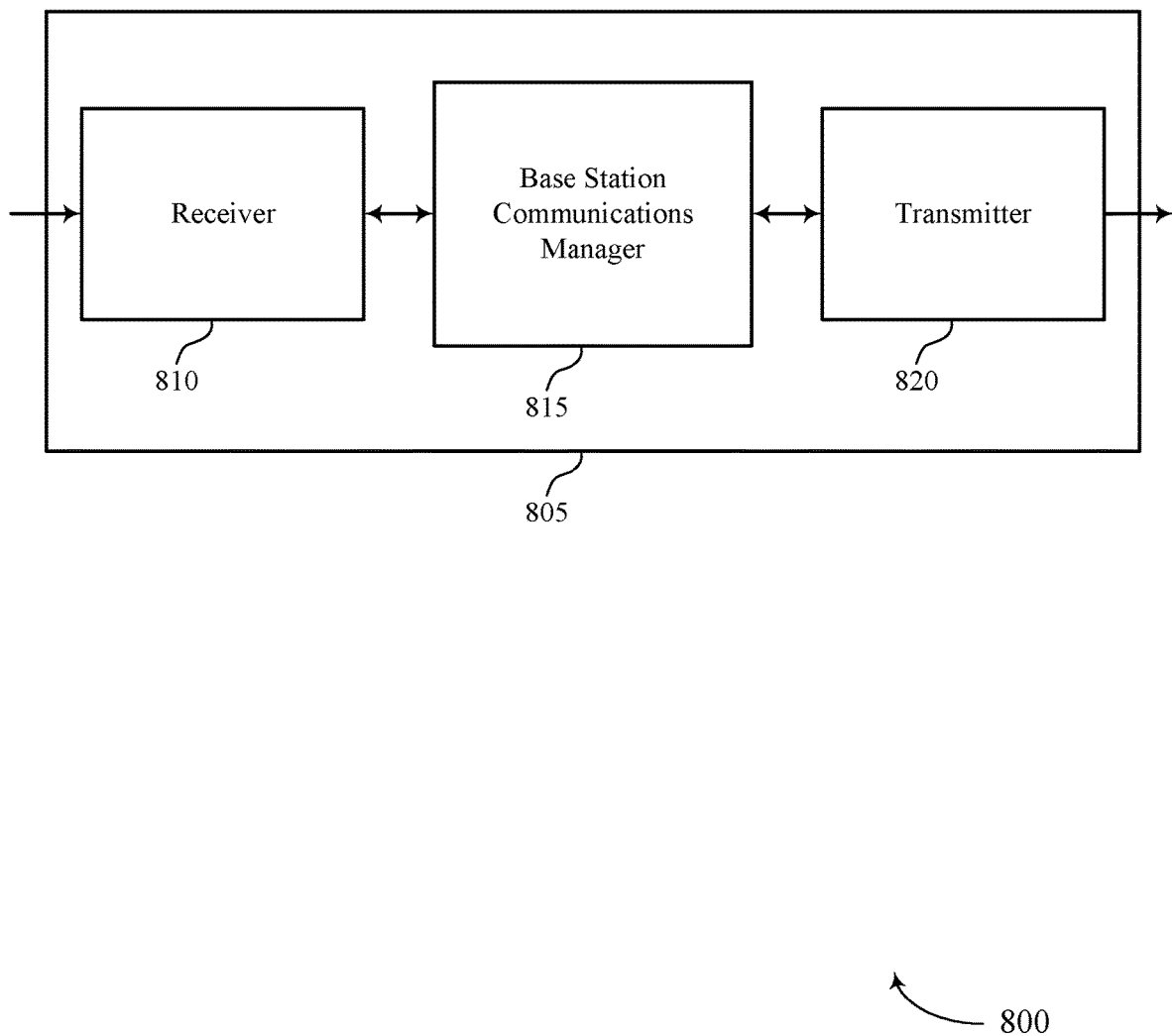
FIGS. 8 through 10 show block diagrams of a device that supports WUS configurations for wireless communications in accordance with aspects of the present disclosure.

FIG. 8 shows a block diagram 800 of a wireless device 805 that supports WUS configurations for wireless communications in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to WUS configurations for wireless communications, etc.). Information may be passed on to other components of the device. The receiver 810 may be an example of aspects of the transceiver 1135 described with reference to FIG. 11. The receiver 810 may utilize a single antenna or a set of antennas.

Base station communications manager 815 may be an example of aspects of the base station communications manager 1115 described with reference to FIG. 11. Base station communications manager 815 and/or at least some of its various sub-components may be implemented in hardware, software executed by a processor, firmware, or any combination thereof. If implemented in software executed by a processor, the functions of the base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may transmit an indication of a scaling factor associated with a WUS to a UE, where the scaling factor is determined based on a transmission characteristic for the WUS. Additionally, base station communications manager 815 may transmit, to the UE and for a WUS time duration, the WUS in accordance with the transmission characteristic of the WUS, where the WUS time duration is determined based on the scaling factor and an associated control channel repetition parameter.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
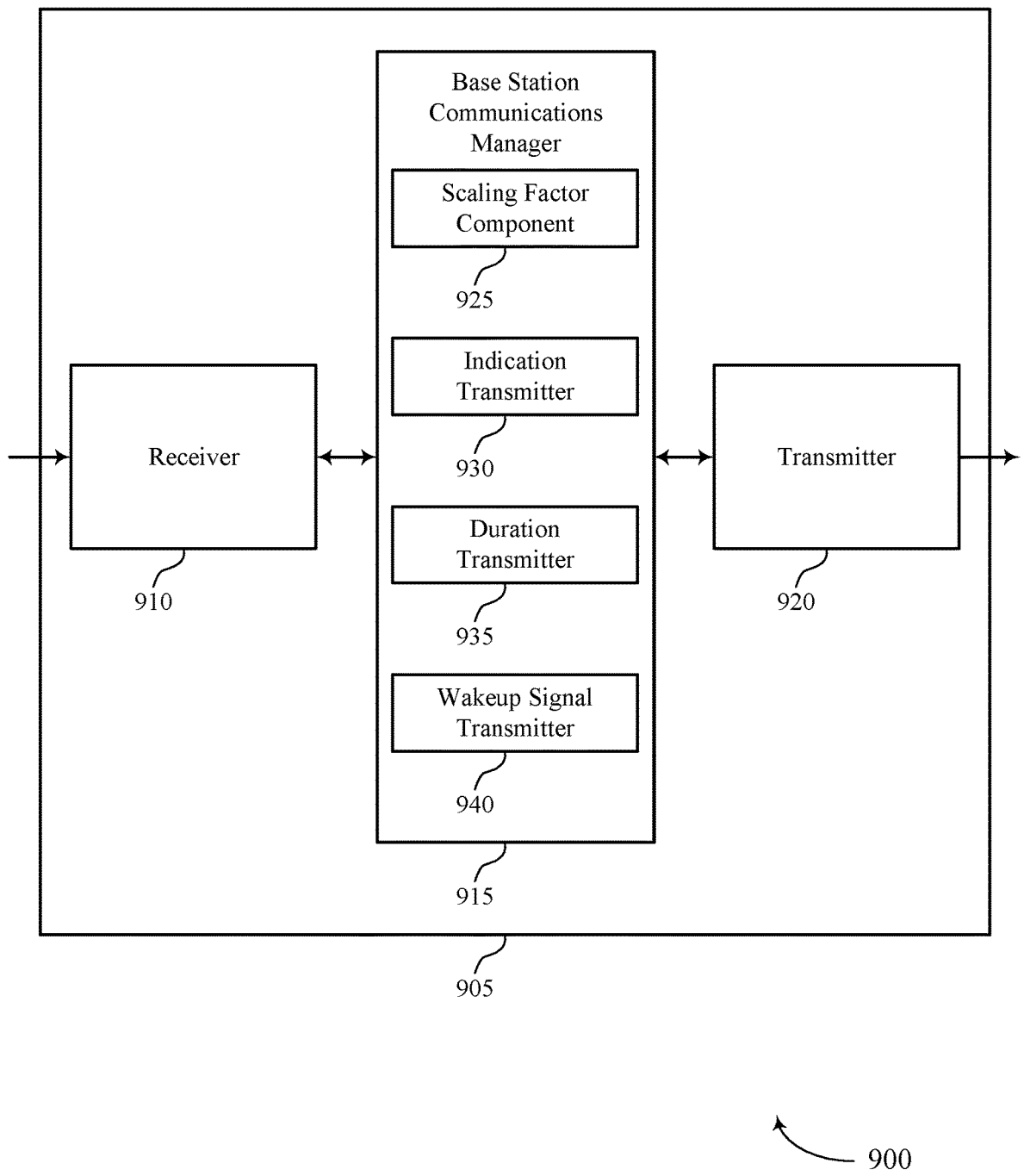

FIG. 9 shows a block diagram 900 of a wireless device 905 that supports WUS configurations for wireless communications in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to WUS configurations for wireless communications, etc.). Information may be passed on to other components of the device. The receiver 910 may be an example of aspects of the transceiver 1135 described with reference to FIG. 11. The receiver 910 may utilize a single antenna or a set of antennas.

Base station communications manager 915 may be an example of aspects of the base station communications manager 1115 described with reference to FIG. 11. Base station communications manager 915 may also include scaling factor component 925, indication transmitter 930, duration transmitter 935, and WUS transmitter 940.

Scaling factor component 925 may determine a scaling factor associated with a WUS, where the scaling factor is based on a transmission characteristic for the WUS and identify an SNR for the UE, where the scaling factor is determined based on the SNR. In some aspects, the transmission characteristic includes a transmit power for the WUS, a transmit diversity scheme for the WUS, a legacy synchronization signal detection of the UE before WUS detection, a power ratio between the WUS and a narrowband reference signal, an MCL associated with the UE, or a combination thereof. Additionally or alternatively, an SNR may be determined based on a power ratio between the WUS and a narrowband reference signal, where a single port SNR is estimated for the WUS based on the SNR. In some cases, the power ratio includes an EPRE power ratio. In some instances, the transmit diversity scheme includes a pattern index of fixed patterns, with each pattern defining a number of fixed basic units and a transmit diversity dimension, or includes the number of fixed basic units and the transmit diversity dimension. Additionally or alternatively, the scaling factor may be based on a transmit diversity scheme that includes a pattern index of fixed patterns, with each pattern defining a number of fixed basic units and a transmit diversity dimension, or includes the number of fixed basic units and the transmit diversity dimension. In some cases, the fixed basic unit includes a number of subframes, a 1 ms TTI, a slot, or a mini-slot.

Indication transmitter 930 may transmit an indication of the scaling factor to a UE and transmit, to the UE, an indication of a transmit diversity dimension for transmission of the WUS. In some cases, the indication of the scaling factor includes a transmit scheme for the WUS. In some examples, transmitting the indication of the scaling factor may include transmitting a SIB that includes the indication of the scaling factor, a value of the scaling factor, or a combination thereof. Additionally, the SIB may include an indication of a power offset parameter that indicates a power ratio between a narrowband reference signal and the WUS Duration transmitter 935 may determine a duration of the WUS based on a relationship between the scaling factor and an associated control channel repetition parameter and transmit, to the UE, a required duration for the WUS, where the required duration is based on a target SNR or MCL associated with the UE. In some cases, the duration of the WUS is determined based on a maximum duration of the WUS (e.g., as indicated via a table for maximum durations of the WUS), a maximum number of repetitions of an associated narrowband control channel, a required number of repetitions of the associated narrowband control channel for the UE, or a combination thereof. In some examples, the duration of the WUS corresponds to a maximum duration of the WUS. In some instances, the associated control channel repetition parameter corresponds to a maximum number of repetitions of an associated narrowband control channel for paging.

WUS transmitter 940 may transmit, to the UE and for the duration of the WUS, the WUS in accordance with the transmission characteristic of the WUS.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
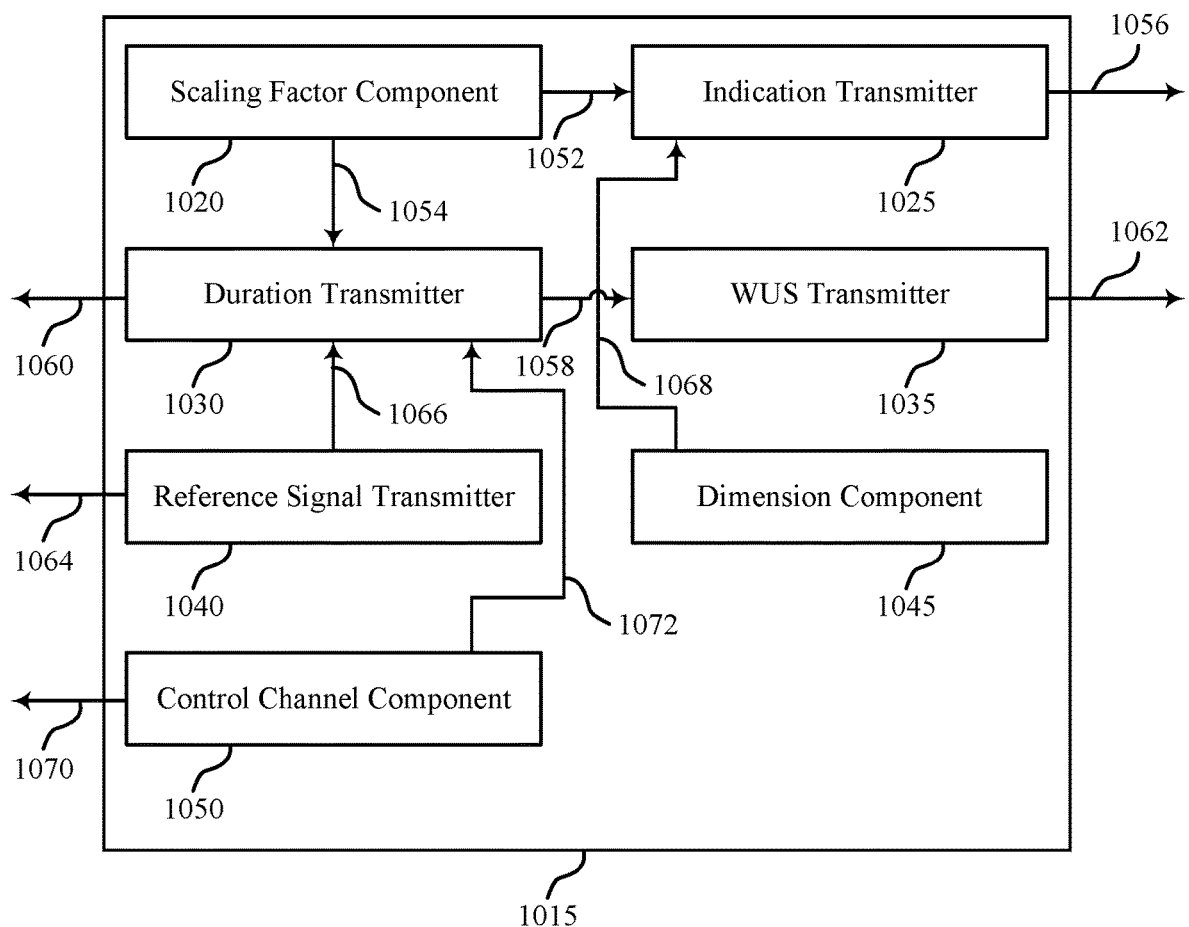

FIG. 10 shows a block diagram 1000 of a base station communications manager 1015 that supports WUS configurations for wireless communications in accordance with aspects of the present disclosure. The base station communications manager 1015 may be an example of aspects of a base station communications manager 1115 described with reference to FIGS. 8, 9, and 11. The base station communications manager 1015 may include scaling factor component 1020, indication transmitter 1025, duration transmitter 1030, WUS transmitter 1035, reference signal transmitter 1040, dimension component 1045, and control channel component 1050. Each of these modules may communicate, directly or indirectly, with one another (e.g., via one or more buses).

Scaling factor component 1020 may determine a scaling factor associated with a WUS, where the scaling factor is based on a transmission characteristic for the WUS and identify an SNR for the UE, where the scaling factor is determined based on the SNR. In some instances, the transmission characteristic includes a transmit power for the WUS, a transmit diversity scheme for the WUS, a legacy synchronization signal detection of the UE before WUS detection, a power ratio between the WUS and a narrowband reference signal, an MCL associated with the UE, or a combination thereof. Additionally or alternatively, an SNR may be determined based on a power ratio between the WUS and a narrowband reference signal, where a single port SNR is estimated for the WUS based on the SNR. In some cases, the power ratio includes an EPRE power ratio.

In some aspects, the transmit diversity scheme includes a pattern index of fixed patterns, with each pattern defining a number of fixed basic units and a transmit diversity dimension, or includes the number of fixed basic units and the transmit diversity dimension. Additionally or alternatively, the scaling factor may be based on a transmit diversity scheme that includes a pattern index of fixed patterns, with each pattern defining a number of fixed basic units and a transmit diversity dimension, or includes the number of fixed basic units and the transmit diversity dimension. In some cases, the fixed basic unit includes a number of subframes, a 1 ms TTI, a slot, or a mini-slot. Scaling factor component 1020 may pass information 1052 to indication transmitter 1025 and information 1054 to duration transmitter 1030, where the information 1052 and 1054 indicates the determined scaling factor.

Indication transmitter 1025 may transmit an indication of the scaling factor (e.g., from information 1052 received from scaling factor component 1020) to a UE and transmit, to the UE, an indication of a transmit diversity dimension for transmission of the WUS. For example, indication transmitter 1025 may pass a signal 1056 to a transmitter 820 or 920 that includes the indication of the scaling factor received from information 1052. In some examples, transmitting the indication of the scaling factor includes transmitting a SIB that includes the indication of the scaling factor, a value of the scaling factor, or a combination thereof. Additionally, the SIB may include an indication of a power offset parameter that indicates a power ratio between a narrowband reference signal and the WUS. In some cases, the indication of the scaling factor includes a transmit scheme for the WUS.

Duration transmitter 1030 may determine a duration of the WUS based on a relationship between the scaling factor (e.g., as indicated via information 1054) and an associated control channel repetition parameter and transmit, to the UE, a required duration for the WUS, where the required duration is based on a target SNR or MCL associated with the UE. For example, duration transmitter 1030 may pass a signal 1060 to the transmitter 820 or 920 that includes the duration of the WUS, the required duration of the WUS, or a combination thereof. In some cases, the duration of the WUS is determined based on a maximum duration of the WUS (e.g., as indicated via a table for maximum durations of the WUS), a maximum number of repetitions of an associated narrowband control channel, a required number of repetitions of the associated narrowband control channel for the UE, or a combination thereof. In some aspects, the duration of the WUS corresponds to a maximum duration of the WUS. In some examples, the associated control channel repetition parameter corresponds to a maximum number of repetitions of an associated narrowband control channel for paging. Duration transmitter 1030 may pass information 1058 indicating the determined duration of the WUS to WUS transmitter 1035.

WUS transmitter 1035 may transmit, to the UE and for the duration of the WUS, the WUS in accordance with the transmission characteristic of the WUS (e.g., based on the indication of the determine duration included in information 1058). For example, WUS transmitter may pass a signal 1062 to the transmitter 820 or 920 that includes the WUS with the determined duration.

Reference signal transmitter 1040 may transmit, to the UE, a reference signal, where the duration of the WUS is based on a signal quality of the reference signal and a probability of detection threshold. For example, reference signal transmitter 1040 may pass a signal 1064 to the transmitter 820 or 920 that includes the reference signal. In some cases, the reference signal includes a narrowband reference signal or a cell-specific reference signal. Additionally, reference signal transmitter 1040 may pass information 1066 to duration transmitter 1030 that includes the reference signal, where the duration is partly based on the signal quality of the reference signal.

Dimension component 1045 may determine the transmit diversity dimension based on a number of antennas switching on one antenna port every configured unit or a number of antenna ports switching on all antenna ports every configured unit, where the configured unit includes a number of fixed basic units for WUS transmission. In some cases, dimension component 1045 may pass information 1068 to indication transmitter 1025 to indicate the transmit diversity dimension for the WUS, where the indication transmitter 1025 transmit the indication of the transmit diversity dimension to the UE (e.g., through signal 1056).

Control channel component 1050 may transmit a maximum number of repetitions of transmissions on a narrowband control channel in a SIB, where the duration of the WUS is based on the maximum number of repetitions of the transmissions on the narrowband control channel. For example, control channel component 1050 may pass a signal 1070 to the transmitter 820 or 920 that includes the maximum number of repetitions of the associated narrowband control channel. Additionally, control channel component 1050 may pass information 1072 to duration transmitter 1030, where the duration of the WUS is based partly on the maximum number of repetitions of the associated narrowband control channel as noted above.

Figure 11:
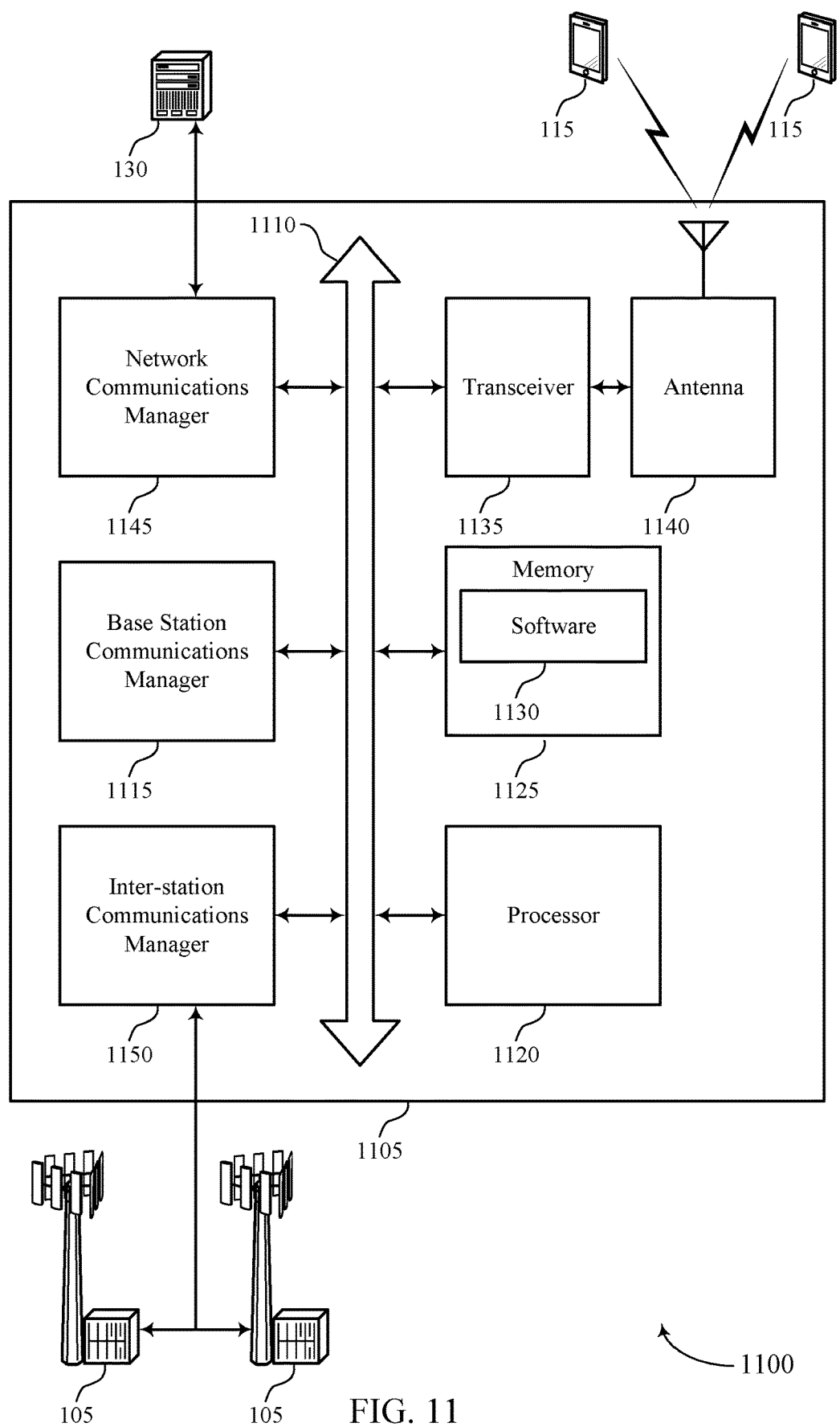
FIG. 11 illustrates a block diagram of a system including a base station that supports WUS configurations for wireless communications in accordance with aspects of the present disclosure.

FIG. 11 shows a diagram of a system 1100 including a device 1105 that supports WUS configurations for wireless communications in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting WUS configurations for wireless communications).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support WUS configurations for wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A/LTE-A Pro wireless communication network technology to provide communication between base stations 105.

Figure 12:
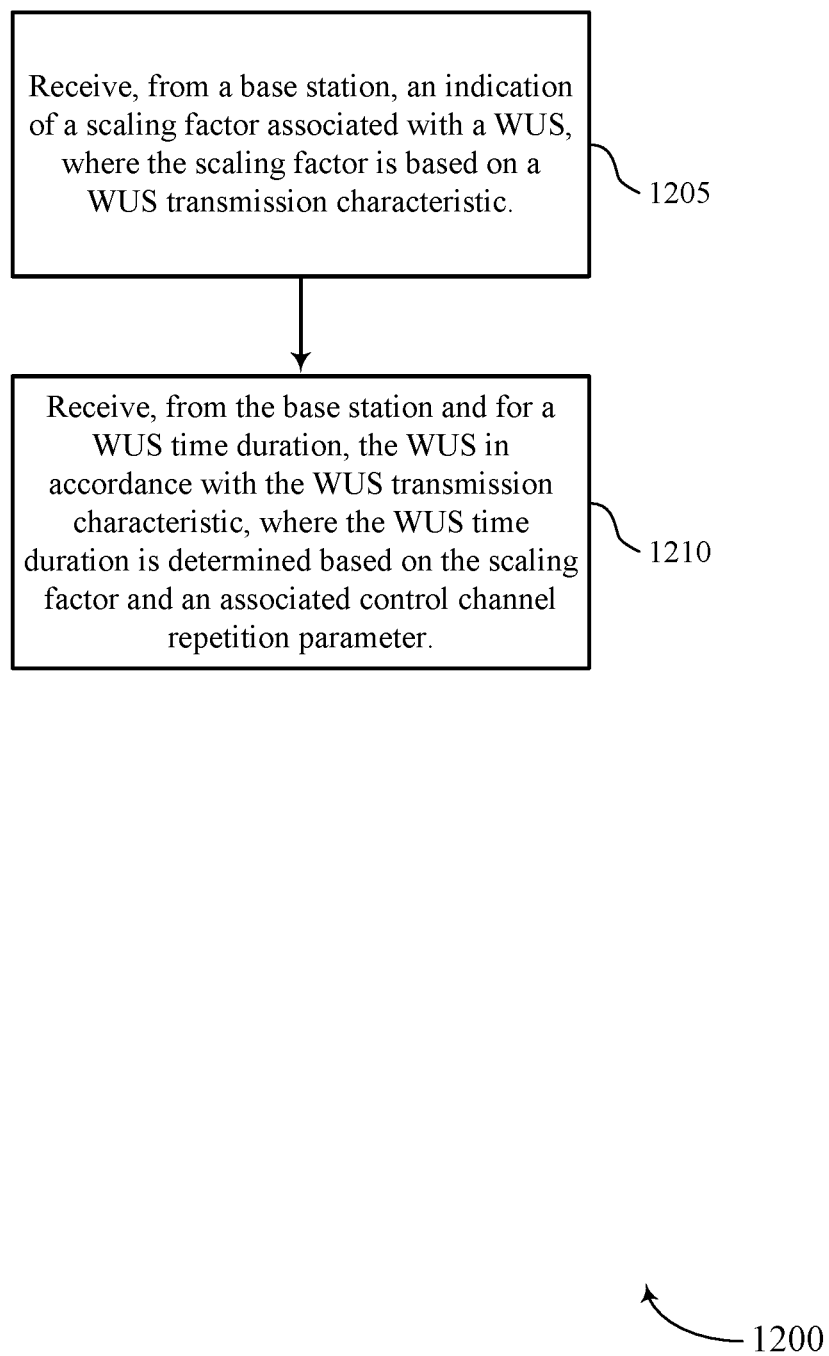
FIGS. 12 and 13 illustrate methods for WUS configurations for wireless communications in accordance with aspects of the present disclosure.

FIG. 12 shows a flowchart illustrating a method 1200 for WUS configurations for wireless communications in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may receive, from a base station, an indication of a scaling factor associated with a WUS, where the scaling factor is based on a WUS transmission characteristic. For example, the UE 115 may identify time-frequency resources over which the indication of the scaling factor may be transmitted (e.g., in a SIB) from a base station 105 serving the cell. The UE 115 may demodulate the transmission over those time-frequency resources and decode the demodulated transmission to obtain bits that indicate the scaling factor. The operations of 1205 may be performed according to the methods described herein. In certain examples, aspects of the operations of 1205 may be performed by an indication component as described with reference to FIGS. 4 through 7.

At 1210 the UE 115 may receive, from the base station and for a WUS time duration, the WUS in accordance with the WUS transmission characteristic, where the WUS time duration is determined based on the scaling factor and an associated control channel repetition parameter. For example, the UE 115 may identify time-frequency resources over which the WUS may be transmitted (e.g., in an NPDCCH) from a base station 105 serving the cell. The UE 115 may demodulate the transmission over those time-frequency resources and decode the demodulated transmission to obtain bits that indicate the WUS. Additionally, the UE 115 may determine a maximum duration of the WUS based on a ratio of the associated control channel repetition parameter and the scaling factor. In other cases, the UE 115 may determine the duration of the WUS based on a maximum duration of the WUS, a maximum number of repetitions of an associated narrowband control channel, a required number of repetitions of the associated narrowband control channel for the UE, or a combination thereof. Additionally, the UE 115 may monitor a downlink channel from the base station for scheduling information based on the received WUS, where the scheduling information includes information for a paging message from the base station 105. The operations of 1210 may be performed according to the methods described herein. In certain examples, aspects of the operations of 1215 may be performed by a WUS component as described with reference to FIGS. 4 through 7.

Figure 13:
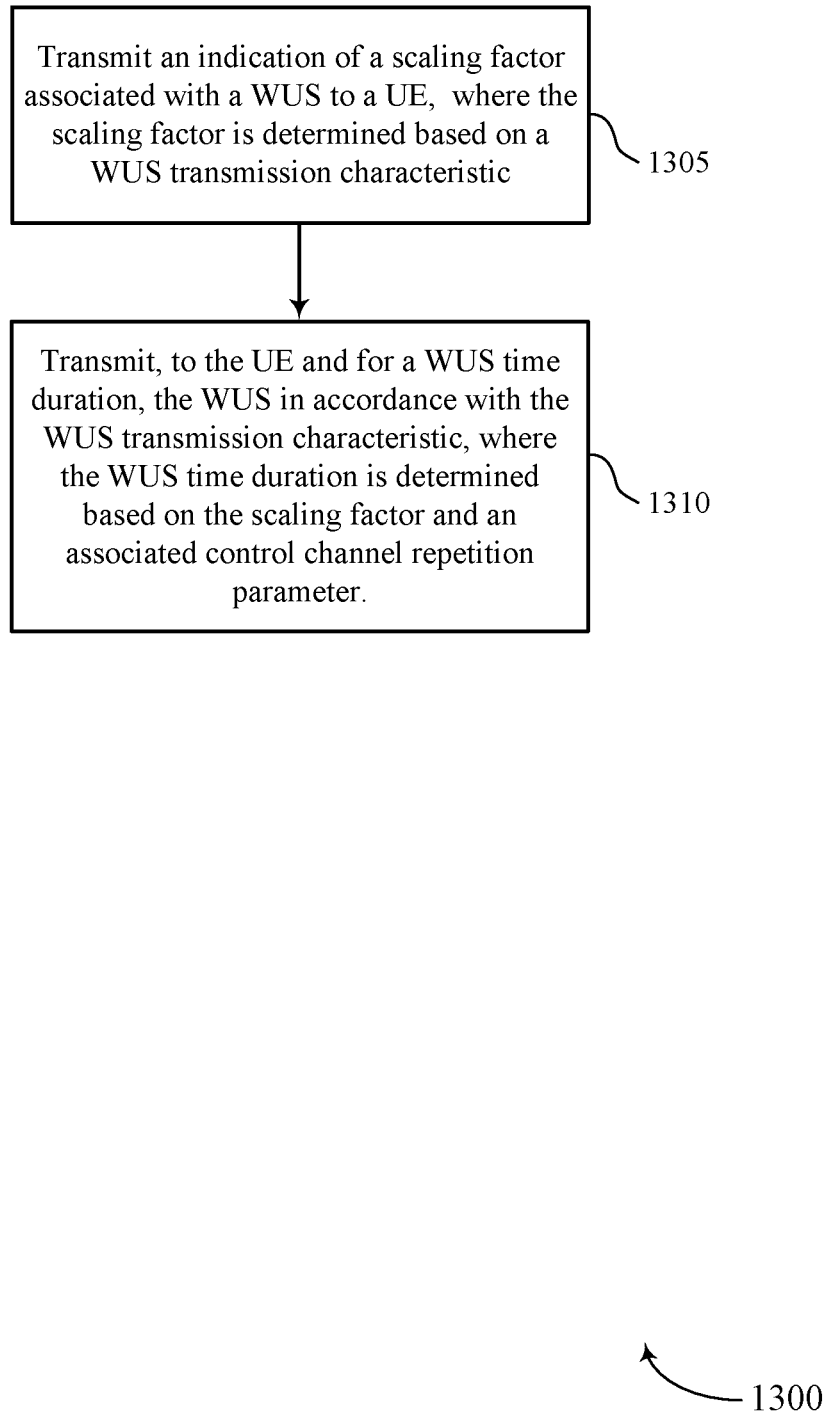

FIG. 13 shows a flowchart illustrating a method 1300 for WUS configurations for wireless communications in accordance with aspects of the present disclosure. The operations of method 1300 may be implemented by a base station 105 or its components as described herein. For example, the operations of method 1300 may be performed by a base station communications manager as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may transmit an indication of a scaling factor associated with a WUS to a UE 115, where the scaling factor is determined based on a WUS transmission characteristic. For example, the base station 105 may encode bits that indicate the indication of the scaling factor, identify time-frequency resources over which the indication of the scaling factor is to be transmitted, and modulate the transmission over the identified time-frequency resources. Additionally, the base station 105 may determine the scaling factor based on the WUS transmission characteristic, which may include a WUS transmit power, a WUS transmit diversity scheme, an indication of a legacy synchronization signal detection of a UE before WUS detection, a power ratio between the WUS and a narrowband reference signal, an MCL associated with a UE, or a combination thereof. The operations of 1305 may be performed according to the methods described herein. In certain examples, aspects of the operations of 1310 may be performed by an indication transmitter as described with reference to FIGS. 8 through 11.

At 1310 the base station 105 may transmit, to the UE 115 and for a WUS time duration, the WUS in accordance with the WUS transmission characteristic, where the WUS time duration is determined based on a relationship between the scaling factor and an associated control channel repetition parameter. For example, the base station 105 may encode bits that indicate the WUS, identify time-frequency resources over which the WUS is to be transmitted, and modulate the transmission over the identified time-frequency resources. Additionally, the base station 105 may determine a maximum duration of the WUS based on a ratio of the associated control channel repetition parameter and the scaling factor. In other cases, the base station 105 may determine the duration of the WUS based on a maximum duration of the WUS, a maximum number of repetitions of an associated narrowband control channel, a required number of repetitions of the associated narrowband control channel for a UE, or a combination thereof. The operations of 1310 may be performed according to the methods described herein. In certain examples, aspects of the operations of 1320 may be performed by a WUS transmitter as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   receiving, from a base station, an indication of a scaling factor associated with a wakeup signal (WUS), wherein the scaling factor is based at least on a WUS transmission characteristic;
   receiving, from the base station and for a WUS time duration, the WUS in accordance with the WUS transmission characteristic, wherein the WUS time duration is based at least on the scaling factor and an associated control channel repetition parameter; and
   monitoring a downlink channel from the base station for scheduling information based at least on the received WUS, wherein the scheduling information comprises information for a paging message from the base station.

2. The method of claim 1, further comprising:
   receiving, from the base station, an indication of the WUS time duration.

3. The method of claim 1, further comprising:
   determining a WUS reception duration based at least on a signal quality of a reference signal and a probability of detection threshold, wherein the WUS reception duration is less than the WUS time duration.

4. The method of claim 3, wherein the WUS reception duration is determined based at least on the WUS transmission characteristic.

5. The method of claim 3, further comprising:
   receiving the reference signal from the base station; and measuring the signal quality of the reference signal.

6. The method of claim 1, wherein receiving the indication of the scaling factor comprises:
   receiving a system information block (SIB) that comprises the indication of the scaling factor, a value of the scaling factor, or a combination thereof.

7. The method of claim 6, further comprising:
   receiving a power offset parameter for the WUS in the SIB.

8. The method of claim 7, further comprising:
   determining that no higher layer signaling has been received to configure a power ratio;
   wherein the power offset parameter comprises a fixed power ratio between a narrowband reference signal and the WUS.

9. The method of claim 7, further comprising:
   determining that no higher layer signaling has been received to configure a power ratio;
   wherein the power offset parameter comprises a fixed power ratio between a cell-specific reference signal and the WUS, and wherein the WUS is associated with machine type communication (MTC).

10. The method of claim 1, further comprising:
    determining a maximum WUS time duration based at least on a ratio of a maximum repetition of an associated control channel and the scaling factor, wherein the WUS time duration is based at least on the maximum WUS time duration, and wherein the associated control channel repetition parameter corresponds to a maximum number of repetitions of an associated narrowband control channel for paging.

11. The method of claim 1, further comprising:
receiving, from the base station, an indication of a transmit diversity dimension for transmission of the WUS.

12. The method of claim 11, wherein the transmit diversity dimension is determined by a number of antennas switching on one antenna port every two subframes or by a number of antenna ports switching on all antenna ports every two subframes.

13. The method of claim 1, wherein the WUS time duration is determined based at least on a predetermined maximum WUS time duration.

14. The method of claim 1, wherein the WUS transmission characteristic comprises a WUS transmit power, a WUS transmit diversity scheme, an indication of a legacy synchronization signal detection before WUS reception, a power ratio between the WUS and a narrowband reference signal, a maximum coupling loss (MCL) associated with the UE, or a combination thereof.

15. The method of claim 1, wherein a signal to noise ratio (SNR) is determined based at least on a power ratio between the WUS and a narrowband reference signal, and wherein a single port SNR is estimated for the WUS based at least on the SNR.

16. The method of claim 1, wherein the scaling factor is based at least in part on a transmit diversity scheme that includes a pattern index of fixed patterns, with each pattern defining a number of fixed basic units and a transmit diversity dimension, or includes the number of fixed basic units and the transmit diversity dimension.

17. The method of claim 16, wherein the fixed basic units comprise subframes, 1 millisecond transmission time intervals (TTIs), slots, or mini-slots.

18. The method of claim 1, further comprising:
receiving a maximum number of repetitions of narrowband control channel transmissions in a system information block (SIB), wherein the WUS time duration is determined based at least on the maximum number of repetitions of the narrowband control channel transmissions.

19. The method of claim 1, wherein further comprising:
determining an early termination duration based at least on a target signal to noise ratio (SNR) or a maximum coupling loss (MCL) associated with the UE, wherein the WUS time duration is based at least on the early termination duration.

20. A method for wireless communications, comprising:
transmitting an indication of a scaling factor associated with a wakeup signal (WUS) to a user equipment (UE), wherein the scaling factor is determined based at least on a WUS transmission characteristic; and
transmitting, to the UE and for a WUS time duration, the WUS in accordance with the WUS transmission characteristic, wherein the WUS time duration is determined based at least on the scaling factor and an associated control channel repetition parameter.

21. The method of claim 20, further comprising:
transmitting, to the UE, an indication of the WUS time duration, wherein the WUS time duration is based at least on a target signal to noise ratio (SNR) or a maximum coupling loss (MCL) associated with the UE.

22. The method of claim 20, further comprising:
transmitting, to the UE, a reference signal, wherein the WUS time duration is based at least on a signal quality of the reference signal and a probability of detection threshold.

23. The method of claim 22, wherein the reference signal comprises a narrowband reference signal or a cell-specific reference signal.

24. The method of claim 20, wherein transmitting the indication of the scaling factor comprises:
transmitting a system information block (SIB) that comprises the indication of the scaling factor, a value of the scaling factor, or a combination thereof.

25. The method of claim 24, wherein the SIB further comprises a power offset parameter that indicates a power ratio between a narrowband reference signal and the WUS.

26. The method of claim 20, further comprising:
transmitting, to the UE, an indication of a transmit diversity dimension for transmission of the WUS.

27. The method of claim 26, further comprising:
determining the transmit diversity dimension based at least in part on a number of antennas switching on one antenna port every two subframes or a number of antenna ports switching on all antenna ports every two subframes.

28. The method of claim 20, wherein the WUS time duration is determined based at least on a predetermined maximum WUS time duration.

29. The method of claim 20, wherein the WUS transmission characteristic comprises a WUS transmit power, a WUS transmit diversity scheme, an indication of a legacy synchronization signal detection of the UE before WUS detection, a power ratio between the WUS and a narrowband reference signal, a maximum coupling loss (MCL) associated with the UE, or a combination thereof.

30. The method of claim 20, wherein a signal to noise ratio (SNR) is determined based at least on a power ratio between the WUS and a narrowband reference signal, and wherein a single port SNR is estimated for the WUS based at least on the SNR.

31. The method of claim 29, wherein the scaling factor is based at least on a transmit diversity scheme that includes a pattern index of fixed patterns, with each pattern defining a number of fixed basic units and a transmit diversity dimension, or includes the number of fixed basic units and the transmit diversity dimension.

32. The method of claim 31, wherein the fixed basic units comprise subframes, 1 millisecond transmission time intervals (TTIs), slots, or mini-slots.

33. The method of claim 20, further comprising:
transmitting a maximum number of repetitions of narrowband control channel transmissions in a system information block (SIB), wherein the WUS time duration is based at least on the maximum number of repetitions of the narrowband control channel transmissions.

34. The method of claim 20, further comprising:
identifying a signal to noise ratio (SNR) for the UE, wherein the scaling factor is determined based at least on the SNR.

35. An apparatus for wireless communications, comprising:
a processor;
memory in electronic communication with the processor; and instructions stored in the memory and executable by the processor to cause the apparatus to:
receive, from a base station, an indication of a scaling factor associated with a wakeup signal (WUS), wherein the scaling factor is based at least on a WUS transmission characteristic;

receive, from the base station and for a WUS time duration, the WUS in accordance with the WUS transmission characteristic, wherein the WUS time duration is based at least on the scaling factor and an associated control channel repetition parameter; and monitor a downlink channel from the base station for scheduling information based at least on the received WUS, wherein the scheduling information comprises information for a paging information from the base station.

36. The apparatus of claim 35, wherein the instructions are further executable by the processor to cause the apparatus to:

receive, from the base station, an indication of the WUS time duration.

37. The apparatus of claim 35, wherein the instructions are further executable by the processor to cause the apparatus to:

determine a WUS reception duration based at least on a signal quality of a reference signal and a probability of detection threshold, wherein WUS reception duration is less than the WUS time duration.

38. The apparatus of claim 37, wherein the WUS reception duration is determined based at least on the WUS transmission characteristic.

39. The apparatus of claim 37, wherein the instructions are further executable by the processor to cause the apparatus to:

receive the reference signal from the base station; and
measure the signal quality of the reference signal.

40. The apparatus of claim 35, wherein the instructions to receive the indication of the scaling factor are executable by the processor to cause the apparatus to:

receive a system information block (SIB) that comprises the indication of the scaling factor, a value of the scaling factor, or a combination thereof.

41. The apparatus of claim 40, wherein the instructions are further executable by the processor to cause the apparatus to:

receive a power offset parameter for the WUS in the SIB.

42. The apparatus of claim 41, wherein the instructions are further executable by the processor to cause the apparatus to:

determine that no higher layer signaling has been received to configure a power ratio;

wherein the power offset parameter comprises a fixed power ratio between a narrowband reference signal and the WUS.

43. The apparatus of claim 41, wherein the instructions are further executable by the processor to cause the apparatus to:

determine that no higher layer signaling has been received to configure a power ratio;

wherein the power offset parameter comprises a fixed power ratio between a cell-specific reference signal and the WUS, and wherein the WUS is associated with machine type communication (MTC).

44. The apparatus of claim 35, wherein the instructions are further executable by the processor to cause the apparatus to:

determine a maximum WUS time duration based at least on a ratio of a maximum repetition of an associated control channel and the scaling factor, wherein the WUS time duration is based at least on the maximum WUS time duration, and wherein the associated control channel repetition parameter corresponds to a maximum number of repetitions of an associated narrowband control channel for paging.

45. The apparatus of claim 35, wherein the instructions are further executable by the processor to cause the apparatus to:

receive, from the base station, an indication of a transmit diversity dimension for transmission of the WUS, wherein the transmit diversity dimension is determined by a number of antennas switching on one antenna port every two subframes or by a number of antenna ports switching on all antenna ports every two subframes.

46. The apparatus of claim 35, wherein the WUS time duration is determined based at least on a predetermined WUS maximum duration.

47. The apparatus of claim 35, wherein the WUS transmission characteristic comprises a WUS transmit power, a WUS transmit diversity scheme, an indication of a legacy synchronization signal detection before WUS reception, a power ratio between the WUS and a narrowband reference signal, a maximum coupling loss (MCL) associated with the UE, or a combination thereof.

48. The apparatus of claim 35, wherein a signal to noise ratio (SNR) is determined based at least on a power ratio between the WUS and a narrowband reference signal, and wherein a single port SNR is estimated for the WUS based at least on the SNR.

49. The apparatus of claim 47, wherein the scaling factor is based at least on a transmit diversity scheme that includes a pattern index of fixed patterns, with each pattern defining a number of fixed basic units and a transmit diversity dimension, or includes the number of fixed basic units and the transmit diversity dimension, the fixed basic units comprising subframes, 1 millisecond transmission time intervals (TTIs), slots, or mini-slots.

50. The apparatus of claim 35, wherein the instructions are further executable by the processor to cause the apparatus to:

receive a maximum number of repetitions of narrowband control channel transmissions in a system information block (SIB), wherein the WUS time duration is determined based at least on the maximum number of repetitions of the narrowband control channel transmissions.

51. The apparatus of claim 35, wherein the instructions are further executable by the processor to cause the apparatus to:

determine an early termination duration based at least on a target signal to noise ratio (SNR) or a maximum coupling loss (MCL) associated with the UE, wherein the WUS time duration is based at least on the early termination duration.

52. An apparatus for wireless communications, comprising: a processor; memory in electronic communication with the processor; and instructions stored in the memory and executable by the processor to cause the apparatus to:

transmit an indication of a scaling factor associated with a wakeup signal (WUS) to a user equipment (UE), wherein the scaling factor is determined based at least on a WUS transmission characteristic; and transmit, to the UE and for a WUS time duration, the WUS in accordance with the WUS transmission characteristic, wherein the WUS time duration is determined based at least on the scaling factor and an associated control channel repetition parameter.

53. The apparatus of claim 52, wherein the instructions are further executable by the processor to cause the apparatus to:
  transmit, to the UE, an indication of the WUS time duration, wherein the WUS time duration is based at least on a target signal to noise ratio (SNR) or a maximum coupling loss (MCL) associated with the UE.

54. The apparatus of claim 52, wherein the instructions are further executable by the processor to cause the apparatus to:
  transmit, to the UE, a reference signal, wherein the WUS time duration is based at least on a signal quality of the reference signal and a probability of detection threshold, and wherein the reference signal comprises a narrowband reference signal or a cell-specific reference signal.

55. The apparatus of claim 52, wherein the instructions to transmit the indication of the scaling factor are executable by the processor to cause the apparatus to:
  transmit a system information block (SIB) that comprises the indication of the scaling factor, a value of the scaling factor, or a combination thereof.

56. The apparatus of claim 55, wherein the SIB further comprises a power offset parameter that indicates a power ratio between a narrowband reference signal and the WUS.

57. The apparatus of claim 52, wherein the instructions are further executable by the processor to cause the apparatus to:
  transmit, to the UE, an indication of a transmit diversity dimension for transmission of the WUS, wherein the transmit diversity dimension based at least on a number of antennas switching on one antenna port every two subframes or a number of antenna ports switching on all antenna ports every two subframes.

58. The apparatus of claim 52, wherein the WUS time duration is determined based at least on a predetermined maximum WUS time duration.

59. The apparatus of claim 52, wherein the WUS transmission characteristic comprises a WUS transmit power, a WUS transmit diversity scheme, an indication of a legacy synchronization signal detection of the UE before WUS detection, a power ratio between the WUS and a narrowband reference signal, a maximum coupling loss (MCL) associated with the UE, or a combination thereof.

60. The apparatus of claim 52, wherein a signal to noise ratio (SNR) is determined based at least on a power ratio between the WUS and a narrowband reference signal, and wherein a single port SNR is estimated for the WUS based at least on the SNR.

61. The apparatus of claim 59, wherein the scaling factor is based at least on a transmit diversity scheme includes a pattern index of fixed patterns, with each pattern defining a number of fixed basic units and a transmit diversity dimension, or includes the number of fixed basic units and the transmit diversity dimension, the fixed basic units comprising subframes, 1 millisecond transmission time intervals (TTIs), slots, or mini-slots.

62. The apparatus of claim 52, wherein the instructions are further executable by the processor to cause the apparatus to:
  transmit a maximum number of repetitions of narrowband control channel transmissions in a system information block (SIB), wherein the WUS time duration is based at least on the maximum number of repetitions of the narrowband control channel transmissions.

63. The apparatus of claim 52, wherein the instructions are further executable by the processor to cause the apparatus to:
  identify a signal to noise ratio (SNR) for the UE, wherein the scaling factor is determined based at least on the SNR.

64. An apparatus for wireless communications, comprising:
  means for receiving, from a base station, an indication of a scaling factor associated with a wakeup signal (WUS), wherein the scaling factor is based at least on a WUS transmission characteristic;
  means for receiving, from the base station and for a WUS time duration, the WUS in accordance with the WUS transmission characteristic, wherein the WUS time duration is determined based at least on the scaling factor and an associated control channel repetition parameter; and
  means for monitoring a downlink channel from the base station for scheduling information based at least on the received WUS, wherein the scheduling information comprises information for a paging message from the base station.

65. The apparatus of claim 64, wherein the means for receiving the indication of the scaling factor comprises:
  means for receiving a system information block (SIB) that comprises the indication of the scaling factor, a value of the scaling factor, or a combination thereof.

66. The apparatus of claim 64, further comprising:
  means for receiving, from the base station, an indication of a transmit diversity dimension for transmission of the WUS.

67. The apparatus of claim 64, further comprising:
  means for receiving a maximum number of repetitions of narrowband control channel transmissions in a system information block (SIB), wherein the WUS time duration is determined based at least on the maximum number of repetitions of the narrowband control channel transmissions.

68. An apparatus for wireless communications, comprising:
  means for transmitting an indication of a scaling factor associated with a wakeup signal (WUS) to a user equipment (UE), wherein the scaling factor is determined based at least on a WUS transmission characteristic; and
  means for transmitting, to the UE and for a WUS time duration, the WUS in accordance with the WUS transmission characteristic, wherein the WUS time duration is determined based at least on the scaling factor and an associated control channel repetition parameter.

69. The apparatus of claim 68, wherein the means for transmitting the indication of the scaling factor comprises:
  means for transmitting a system information block (SIB) that comprises the indication of the scaling factor, a value of the scaling factor, or a combination thereof.

70. The apparatus of claim 68, further comprising:
  means for transmitting, to the UE, an indication of a transmit diversity dimension for transmission of the WUS.

71. The apparatus of claim 68, further comprising:
  means for transmitting a maximum number of repetitions of narrowband control channel transmissions in a system information block (SIB), wherein the WUS time duration is based at least on the maximum number of repetitions of the narrowband control channel transmissions.

72. A non-transitory computer-readable medium storing code for wireless communications, the code comprising instructions executable by a processor to:

receive, from a base station, an indication of a scaling factor associated with a wakeup signal (WUS), wherein the scaling factor is based at least on a WUS transmission characteristic;

receive, from the base station and for a WUS time duration, the WUS in accordance with the WUS transmission characteristic, wherein the WUS time duration is determined based at least on the scaling factor and an associated control channel repetition parameter; and monitor a downlink channel from the base station for scheduling information based at least on the received WUS, wherein the scheduling information comprises information for a paging information from the base station.

73. The non-transitory computer-readable medium of claim 72, wherein the instructions to receive the indication of the scaling factor are executable by the processor to:

receive a system information block (SIB) that comprises the indication of the scaling factor, a value of the scaling factor, or a combination thereof.

74. The non-transitory computer-readable medium of claim 72, wherein the instructions are further executable by the processor to:

receive, from the base station, an indication of a transmit diversity dimension for transmission of the WUS.

75. The non-transitory computer-readable medium of claim 72, wherein the instructions are further executable by the processor to:

receive a maximum number of repetitions of narrowband control channel transmissions in a system information block (SIB), wherein the WUS time duration is determined based at least on the maximum number of repetitions of the narrowband control channel transmissions.

76. A non-transitory computer-readable medium storing code for wireless communications, the code comprising instructions executable by a processor to:

transmit an indication of a scaling factor associated with a wakeup signal (WUS) to a user equipment (UE), wherein the scaling factor is determined based at least on a WUS transmission characteristic; and transmit, to the UE and for a WUS time duration, the WUS in accordance with the WUS transmission characteristic, wherein the WUS time duration is determined based at least on the scaling factor and an associated control channel repetition parameter.

77. The non-transitory computer-readable medium of claim 76, wherein the instructions to transmit the indication of the scaling factor are executable by the processor to:

transmit a system information block (SIB) that comprises the indication of the scaling factor, a value of the scaling factor, or a combination thereof.

78. The non-transitory computer-readable medium of claim 76, wherein the instructions are further executable by the processor to:

transmit, to the UE, an indication of a transmit diversity dimension for transmission of the WUS.

79. The non-transitory computer-readable medium of claim 76, wherein the instructions are further executable by the processor to:

transmit a maximum number of repetitions of narrowband control channel transmissions in a system information block (SIB), wherein the WUS time duration is based at least on the maximum number of repetitions of the narrowband control channel transmissions.

\* \* \* \* \*